United States Patent
Yamamoto et al.

(10) Patent No.: US 12,221,705 B2
(45) Date of Patent: *Feb. 11, 2025

(54) ALLOYED GALVANIZED STEEL SHEET, ELECTRODEPOSITION-COATED STEEL SHEET, AUTOMOTIVE PART, METHOD OF PRODUCING ELECTRODEPOSITION-COATED STEEL SHEET, AND METHOD OF PRODUCING ALLOYED GALVANIZED STEEL SHEET

(71) Applicant: JFE STEEL CORPORATION, Tokyo (JP)

(72) Inventors: Shunsuke Yamamoto, Tokyo (JP); Katsutoshi Takashima, Tokyo (JP); Mai Aoyama, Tokyo (JP); Yusuke Okumura, Tokyo (JP); Tomomi Kanazawa, Tokyo (JP); Katsuya Hoshino, Tokyo (JP); Hiroshi Matsuda, Tokyo (JP); Ei Okumura, Tokyo (JP); Yoichi Makimizu, Tokyo (JP); Masaki Koba, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/251,269

(22) PCT Filed: Nov. 5, 2021

(86) PCT No.: PCT/JP2021/040870
§ 371 (c)(1),
(2) Date: May 1, 2023

(87) PCT Pub. No.: WO2022/097733
PCT Pub. Date: May 12, 2022

(65) Prior Publication Data
US 2023/0407485 A1 Dec. 21, 2023

(30) Foreign Application Priority Data
Nov. 6, 2020 (JP) ................................ 2020-186205

(51) Int. Cl.
C23C 28/02 (2006.01)
C21D 1/74 (2006.01)
(Continued)

(52) U.S. Cl.
CPC .............. *C23C 28/021* (2013.01); *C21D 1/74* (2013.01); *C21D 6/001* (2013.01); *C21D 6/002* (2013.01);
(Continued)

(58) Field of Classification Search
None
See application file for complete search history.

(56) References Cited

U.S. PATENT DOCUMENTS 5,326,648 A 7/1994 Kato et al.
5,447,802 A * 9/1995 Tobiyama ............... C22C 38/06
205/228
(Continued)

FOREIGN PATENT DOCUMENTS

EP 3913106 A1 11/2021
JP H05132747 A 5/1993
(Continued)

OTHER PUBLICATIONS

Apr. 24, 2024, the Extended European Search Report issued by the European Patent Office in the corresponding European Patent Application No. 21889285.9.
(Continued)

*Primary Examiner* — Seth Dumbris
(74) *Attorney, Agent, or Firm* — KENJA IP LAW PC

(57) ABSTRACT

Provided is an alloyed galvanized steel sheet with excellent resistance to cracking in resistance welding at a welded
(Continued)

portion, even if crystal orientations of an Fe-based electroplating layer and a cold-rolled steel sheet are integrated at a high ratio at the interface between the Fe-based electroplating layer and the cold-rolled steel sheet. The alloyed galvanized steel sheet has a Si-containing cold-rolled steel sheet containing Si in an amount of 0.1 mass % to 3.0 mass %; an Fe-based electroplating layer formed on at least one surface of the Si-containing cold-rolled steel sheet with a coating weight per surface exceeding 20.0 g/m$^2$, and an alloyed galvanized layer formed on the Fe-based electroplating layer, where crystal orientations of the Fe-based electroplating layer and the Si-containing cold-rolled steel sheet are integrated at a ratio of more than 50% at the interface between the Fe-based electroplating layer and the Si-containing cold-rolled steel sheet.

16 Claims, 8 Drawing Sheets

(51) Int. Cl.
| | | |
|---|---|---|
| *C21D 6/00* | (2006.01) | |
| *C21D 8/02* | (2006.01) | |
| *C21D 9/46* | (2006.01) | |
| *C22C 33/04* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/08* | (2006.01) | |
| *C22C 38/12* | (2006.01) | |
| *C22C 38/14* | (2006.01) | |
| *C22C 38/16* | (2006.01) | |
| *C22C 38/28* | (2006.01) | |
| *C22C 38/32* | (2006.01) | |
| *C22C 38/38* | (2006.01) | |
| *C23C 2/02* | (2006.01) | |
| *C23C 2/26* | (2006.01) | |
| *C23C 2/28* | (2006.01) | |
| *C25D 3/20* | (2006.01) | |
| *C25D 5/36* | (2006.01) | |
| *C23C 2/06* | (2006.01) | |
| *C23C 2/40* | (2006.01) | |

(52) U.S. Cl.
CPC ............. *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0278* (2013.01); *C21D 9/46* (2013.01); *C22C 33/04* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/28* (2013.01); *C22C 38/32* (2013.01); *C22C 38/38* (2013.01); *C23C 2/02* (2013.01); *C23C 2/024* (2022.08); *C23C 2/26* (2013.01); *C23C 2/28* (2013.01); *C25D 3/20* (2013.01); *C25D 5/36* (2013.01); *C21D 2251/02* (2013.01); *C23C 2/06* (2013.01); *C23C 2/40* (2013.01); *Y10T 428/12958* (2015.01)

(56) References Cited

U.S. PATENT DOCUMENTS

| | | | |
|---|---|---|---|
| 11,274,356 | B2 | 3/2022 | Takeda et al. |
| 2012/0211129 | A1* | 8/2012 | Inaguma ................. C22C 38/02 |
| | | | 148/400 |
| 2014/0349133 | A1 | 11/2014 | Lee et al. |
| 2014/0363697 | A1* | 12/2014 | Kim ..................... C23C 28/3225 |
| | | | 205/152 |

FOREIGN PATENT DOCUMENTS

| | | | |
|---|---|---|---|
| JP | H10330846 | A | 12/1998 |
| JP | 2006097067 | A | 4/2006 |
| JP | 4791992 | B2 | 10/2011 |
| JP | 2015500925 | A | 1/2015 |
| JP | 6388099 | B1 | 9/2018 |
| WO | WO-2020148944 | A1 * | 7/2020 ........... B32B 15/013 |
| WO | 2021200412 | A1 | 10/2021 |

OTHER PUBLICATIONS

Jan. 24, 2023, Notification of Reasons for Refusal issued by the Japan Patent Office in the corresponding Japanese Patent Application No. 2022-520146 with English language Concise Statement of Relevance.

Jan. 25, 2022, International Search Report issued in the International Patent Application No. PCT/JP2021/040870.

Dec. 1, 2024, Office Action issued by the Korean Intellectual Property Office in the corresponding Korean Patent Application No. 10-2023-7018523 with English language Concise Statement of Relevance.

* cited by examiner

ALLOYED GALVANIZED STEEL SHEET, ELECTRODEPOSITION-COATED STEEL SHEET, AUTOMOTIVE PART, METHOD OF PRODUCING ELECTRODEPOSITION-COATED STEEL SHEET, AND METHOD OF PRODUCING ALLOYED GALVANIZED STEEL SHEET

TECHNICAL FIELD

This disclosure relates to an alloyed galvanized steel sheet with excellent resistance to cracking in resistance welding, an electrodeposition-coated steel sheet, an automotive part, a method of producing an electrodeposition-coated steel sheet, and a method of producing an alloyed galvanized steel sheet.

BACKGROUND

In recent years, there has been a strong demand to improve the fuel efficiency of automobiles from the viewpoint of protecting the global environment. In addition, there has been a strong demand for improved automobile safety from the viewpoint of ensuring occupant safety in the event of a collision. In order to meet these demands, it is necessary to achieve lightweight and high-strength automotive bodies, and the use of high-strength cold-rolled steel sheets as the material for automotive parts is being actively promoted to achieve sheet metal thinning. However, since most automotive parts are manufactured by forming steel sheets, these steel sheets are required to have excellent formability in addition to high strength.

There are various methods to increase the strength of steel sheets. One method that can increase strength without significantly compromising the formability of steel sheets is solid solution strengthening by adding Si. On the other hand, in the manufacture of automotive parts, press-formed parts are often combined by resistance welding (spot welding). If the part to be subjected to resistance welding contains a high-strength galvanized steel sheet, there is concern that liquid metal embrittlement (LME) may occur during resistance welding when residual stresses are generated in the vicinity of a welded portion and the zinc in the coated or plated layer melts and diffuses into crystal grain boundaries, resulting in intergranular cracking (or LME cracking) in the steel sheet. If resistance welding is performed with the welding electrode at an angle to the steel sheet, residual stresses may increase and cracks may form. Residual stresses are expected to increase with higher strength of the steel sheet, and thus there is concern about cracking in resistance welding associated with higher strength of the steel sheet. This problem of LME cracking is particularly pronounced in Si-containing steel sheets.

Therefore, there is a need for a high-strength steel sheet with excellent resistance to cracking in resistance welding at a welded portion.

Conventionally, remedial measures for the above issues have been reported. For example, JP 6388099 B (PTL 1) describes a hot-dip galvanized steel sheet having an internal oxidation layer in which the crystal grain boundaries are coated at least partially with oxides from the surface of the base metal to a depth of 5.0 µm or more, wherein the grain boundary coverage of the oxides is 60% or more in the region ranging from the surface of the base metal to a depth of 5.0 µm. Further, PTL 2 (JP 4791992 B) describes suppressing cracking at a welded portion under high current conditions where splashing (or spatters) occurs by controlling hot rolling conditions to suppress grain boundary oxidation and also by performing Fe coating or plating after cold rolling to suppress grain boundary oxidation during reduction annealing so that the depth of grain boundary oxidation is reduced to 5.0 µm or less.

CITATION LIST

Patent Literature

PTL 1: JP 6388099 B
PTL 2: JP 4791992 B

SUMMARY

Technical Problem

We have newly found that forming an Fe-based electroplating layer on the surface of a steel sheet can improve the resistance to cracking in resistance welding. On the other hand, we also have found that, when the steel sheet is subjected to annealing after the formation of the Fe-based electroplating layer, the crystal orientations of the Fe-based electroplating layer and the cold-rolled steel sheet are integrated at a high ratio at the interface between the Fe-based electroplating layer and the cold-rolled steel sheet depending on the annealing conditions. We have found that, in such a cold-rolled steel sheet where the crystal orientations are integrated at a high ratio, zinc melted during resistance welding easily penetrates into the crystal grain boundaries in the cold-rolled steel sheet via the crystal grain boundaries in the Fe-based electroplating layer. Further, we have found that this problem becomes more pronounced when alloying treatment is applied to hot dip galvanizing, because the surface layer of Fe-based electroplating is consumed by alloying. This is not described in PTL 1 at all.

The LME cracking described above can be broadly classified into cracking that occurs on the surface in contact with the electrode (hereinafter referred to as "surface cracking") and cracking that occurs near the corona bond between steel sheets (hereinafter referred to as "internal cracking"), as will be described later. The resistance to cracking in resistance welding in this specification refers specifically to properties of preventing internal cracking. PTL 2 describes the problem of improvement of surface cracking, and there is no suggestion regarding internal cracking, which may occur within an appropriate current range where spatters do not occur. Further, the Fe-based electroplating is intended to play the role of a protective layer that functions as a grain boundary oxidation inhibitor during reduction annealing, and the effect of the Fe-based electroplating itself on improving resistance to cracking in resistance welding has not been investigated.

It could thus be helpful to provide an alloyed galvanized steel sheet with excellent resistance to cracking in resistance welding at a welded portion, even if the crystal orientations of an Fe-based electroplating layer and a cold-rolled steel sheet are integrated at a high ratio at the interface between the Fe-based electroplating layer and the cold-rolled steel sheet.

Solution to Problem

In order to solve the above problem, we have made intensive studies and found that it is important to form an Fe-based electroplating layer before subjection to annealing as a pre-plating layer prior to the formation of a galvanized layer on a surface of a cold-rolled steel sheet after subjection to cold rolling and before subjection to an annealing process so that the coating weight per surface of the Fe-based electroplating layer on a finally obtained alloyed galvanized steel sheet is more than 20.0 g/m², to satisfy a high level of resistance to cracking in resistance welding at a welded portion. We have found that forming a soft Fe-based electroplating layer with a coating weight of more than 20.0 g/m² per surface of the cold-rolled steel sheet reduces the stress applied to the steel sheet surface during welding, and, when the cold-rolled steel sheet contains Si, the Fe-based electroplating layer can act as a layer deficient in solute Si to suppress the decrease in toughness due to solid dissolution of Si and improve the resistance to cracking in resistance welding at a welded portion, thereby completing the present disclosure.

The present disclosure is based on the aforementioned discoveries. Specifically, primary features of the present disclosure are as follows.

[1] An alloyed galvanized steel sheet comprising:
a Si-containing cold-rolled steel sheet containing Si in an amount of 0.1 mass % or more and 3.0 mass % or less;
an Fe-based electroplating layer formed on at least one surface of the Si-containing cold-rolled steel sheet with a coating weight per surface of more than 20.0 g/m²; and
an alloyed galvanized layer formed on the Fe-based electroplating layer, wherein
crystal orientations of the Fe-based electroplating layer and the Si-containing cold-rolled steel sheet are integrated at a ratio of more than 50% at an interface between the Fe-based electroplating layer and the Si-containing cold-rolled steel sheet.

[2] The alloyed galvanized steel sheet according to aspect [1], wherein the Si-containing cold-rolled steel sheet contains Si in an amount of 0.50 mass % or more and 3.0 mass % or less.

[3] The alloyed galvanized steel sheet according to aspect [1] or [2], wherein the Fe-based electroplating layer is formed with a coating weight per surface of 25.0 g/m² or more.

[4] The alloyed galvanized steel sheet according to any one of aspects [1] to [3], wherein the Si-containing cold-rolled steel sheet has a chemical composition containing, in addition to Si, in mass %,
C: 0.8% or less,
Mn: 1.0% or more and 12.0% or less,
P: 0.1% or less,
S: 0.03% or less,
N: 0.010% or less, and
Al: 1.0% or less, with the balance being Fe and inevitable impurities.

[5] The alloyed galvanized steel sheet according to aspect [4], wherein the chemical composition further comprises at least one selected from the group consisting of
B: 0.005% or less,
Ti: 0.2% or less,
Cr: 1.0% or less,
Cu: 1.0% or less,
Ni: 1.0% or less,
Mo: 1.0% or less,
Nb: 0.20% or less,
V: 0.5% or less,
Sb: 0.200% or less,
Ta: 0.1% or less,
W: 0.5% or less,
Zr: 0.1% or less,
Sn: 0.20% or less,
Ca: 0.005% or less,
Mg: 0.005% or less, and
REM: 0.005% or less.

[6] The alloyed galvanized steel sheet according to any one of aspects [1] to [5], wherein the Fe-based electroplating layer has a chemical composition containing at least one element selected from the group consisting of B, C, P, N, O, Ni, Mn, Mo, Zn, W, Pb, Sn, Cr, V, and Co, in a total amount of 10 mass % or less, with the balance being Fe and inevitable impurities.

[7] An alloyed galvanized steel sheet comprising:
a cold-rolled steel sheet;
an Fe-based electroplating layer formed on at least one surface of the cold-rolled steel sheet with a coating weight per surface of more than 20.0 g/m²; and
an alloyed galvanized layer formed on the Fe-based electroplating layer, wherein
crystal orientations of the Fe-based electroplating layer and the cold-rolled steel sheet are integrated at a ratio of more than 50% at an interface between the Fe-based electroplating layer and the cold-rolled steel sheet.

As used herein, the cold-rolled steel sheet is a cold-rolled steel sheet where a test specimen of the cold-rolled steel sheet that is cut to a size of 50 mm×150 mm with a direction orthogonal to a rolling direction as a lengthwise direction is overlapped with a test galvannealed steel sheet that is cut to the same size having a hot-dip galvanized layer with a coating weight per surface of 50 g/m² to obtain a sheet combination, next, using a 50-Hz single-phase AC resistance welding machine of servomotor pressure type, the sheet combination is inclined 5° to a lengthwise direction side of the sheet combination with respect to a plane perpendicular to a line connecting central axes of an electrode pair with a tip diameter of 6 mm of the resistance welding machine, a lower electrode of the electrode pair and the sheet combination are fixed so that a gap of 60 mm in a lengthwise direction of the sheet combination and 2.0 mm in a thickness direction of the sheet combination is provided between the lower electrode and the test specimen, an upper electrode of the electrode pair is movable, and resistance welding is applied to the sheet combination under a set of conditions: applied pressure: 3.5 kN, hold time: 0.16 seconds, and welding current and welding time to produce a nugget diameter of 5.9 mm, to obtain a sheet combination with a welded portion, and the sheet combination with a welded portion is then cut in half along a lengthwise direction of the test specimen to include a welded portion, a cross section of the welded portion is observed under an optical microscopy at a magnification of 200×, and a crack as long as 0.1 mm or more is observed.

[8] The alloyed galvanized steel sheet according to aspect [7], wherein the cold-rolled steel sheet is a cold-rolled steel sheet where the sheet combination with a welded portion is obtained by performing the resistance welding with the hold time being 0.24 seconds, a cross section of the welded portion is observed under the optical microscopy at a magnification of 200×, and a crack as long as 0.1 mm or more is observed.

[9] An electrodeposition-coated steel sheet comprising: a chemical conversion layer formed on the alloyed galvanized steel sheet as recited in any one of aspects [1]

to [8]; and an electrodeposition coating layer formed on the chemical conversion layer.

[10] An automotive part at least partially made from the electrodeposition-coated steel sheet as recited in aspect [9].

[11] A method of producing an electrodeposition-coated steel sheet, the method comprising:
subjecting the alloyed galvanized steel sheet as recited in any one of aspects [1] to [8] to chemical conversion treatment to obtain a chemical-conversion-treated steel sheet with a chemical conversion layer formed on the alloyed galvanized layer; and
subjecting the chemical-conversion-treated steel sheet to electrodeposition coating treatment to obtain an electrodeposition-coated steel sheet with an electrodeposition coating layer formed on the chemical conversion layer.

[12] A method of producing an alloyed galvanized steel sheet, the method comprising:
subjecting a cold-rolled steel sheet containing Si in an amount of 0.1 mass % or more and 3.0 mass % or less to Fe-based electroplating to obtain a pre-annealing Fe-based electroplated steel sheet with a pre-annealing Fe-based electroplating layer formed on at least one surface thereof;
then subjecting the pre-annealing Fe-based electroplated steel sheet to annealing in an atmosphere with a dew point of −30° C. or lower to obtain an Fe-based electroplated steel sheet;
then subjecting the Fe-based electroplated steel sheet to galvanization to obtain a galvanized steel sheet; and
then further subjecting the galvanized steel sheet to alloying treatment to obtain an alloyed galvanized steel sheet comprising an Fe-based electroplating layer having a coating weight per surface of more than 20.0 g/m².

[13] The method of producing an alloyed galvanized steel sheet according to aspect [12], wherein the cold-rolled steel sheet contains Si in an amount of 0.5 mass % or more and 3.0 mass % or less.

[14] The method of producing an alloyed galvanized steel sheet according to aspect [12] or [13], wherein a coating weight (g/m²) per surface of the pre-annealing Fe-based electroplating layer, denoted by $C.W._{Fe0}$, satisfies the following formula (1):

$$(C.W._{Fe0}) > 20.0 + (C.W._{Zn}) \times [mass\%Fe]/100 \quad (1)$$

where $C.W._{Zn}$ denotes a target value of a coating weight (g/m²) per surface of the alloyed galvanized layer, provided:

$$25.0 \text{ g/m}^2 \leq C.W._{Zn} \leq 80.0 \text{ g/m}^2, \text{ and}$$

[mass % Fe] denotes a target value of an Fe content (mass %) in the alloyed galvanized layer.

[15] A method of producing an alloyed galvanized steel sheet, the method comprising:
subjecting a cold-rolled steel sheet to Fe-based electroplating to obtain a pre-annealing Fe-based electroplated steel sheet with a pre-annealing Fe-based electroplating layer formed on at least one surface thereof;
then subjecting the pre-annealing Fe-based electroplated steel sheet to annealing in an atmosphere with a dew point of −30° C. or lower to obtain an Fe-based electroplated steel sheet;
then subjecting the Fe-based electroplated steel sheet to galvanization to obtain a galvanized steel sheet; and
then further subjecting the galvanized steel sheet to alloying treatment to obtain an alloyed galvanized steel sheet comprising an Fe-based electroplating layer having a coating weight per surface of more than 20.0 g/m².

As used herein, the cold-rolled steel sheet is a cold-rolled steel sheet where a test specimen of the cold-rolled steel sheet that is cut to a size of 50 mm×150 mm with a direction orthogonal to a rolling direction as a lengthwise direction is overlapped with a test galvannealed steel sheet that is cut to the same size having a hot-dip galvanized layer with a coating weight per surface of 50 g/m² to obtain a sheet combination, next, using a 50-Hz single-phase AC resistance welding machine of servomotor pressure type, the sheet combination is inclined 5° to a lengthwise direction side of the sheet combination with respect to a plane perpendicular to a line connecting central axes of an electrode pair with a tip diameter of 6 mm of the resistance welding machine, a lower electrode of the electrode pair and the sheet combination are fixed so that a gap of 60 mm in a lengthwise direction of the sheet combination and 2.0 mm in a thickness direction of the sheet combination is provided between the lower electrode and the test specimen, an upper electrode of the electrode pair is movable, and resistance welding is applied to the sheet combination under a set of conditions: applied pressure: 3.5 kN, hold time: 0.16 seconds, and welding current and welding time to produce a nugget diameter of 5.9 mm, to obtain a sheet combination with a welded portion, and the sheet combination with a welded portion is then cut in half along a lengthwise direction of the test specimen to include a welded portion, a cross section of the welded portion is observed under an optical microscopy at a magnification of 200×, and a crack as long as 0.1 mm or more is observed.

[16] The method of producing an alloyed galvanized steel sheet according to aspect [15], wherein the cold-rolled steel sheet is a cold-rolled steel sheet where, when the hold time is 0.24 seconds and a cross section of the welded portion is observed under an optical microscopy at a magnification of 200×, a crack as long as 0.1 mm or more is observed.

[17] The method of producing an alloyed galvanized steel sheet according to aspect [15] or [16], wherein a coating weight (g/m²) per surface of the pre-annealing Fe-based electroplating layer, denoted by $C.W._{Fe0}$, satisfies the following formula (1):

$$(C.W._{Fe0}) > 20.0 + (C.W._{Zn}) \times [mass\%Fe]/100 \quad (1)$$

where $C.W._{Zn}$ denotes a target value of a coating weight (g/m²) per surface of the alloyed galvanized layer, provided:

$$25.0 \text{ g/m}^2 \leq C.W._{Zn} \leq 80.0 \text{ g/m}^2, \text{ and}$$

[mass % Fe] denotes a target value of an Fe content (mass %) in the alloyed galvanized layer.

[18] The method of producing an alloyed galvanized steel sheet according to any one of aspects [12] to [17], wherein the Fe-based electroplating is performed in an Fe-based electroplating bath containing at least one element selected from the group consisting of B, C, P, N, O, Ni, Mn, Mo, Zn, W, Pb, Sn, Cr, V, and Co, so that the at least one element is contained in the pre-annealing Fe-based electroplating layer in a total amount of 10 mass % or less.

Advantageous Effect

According to this disclosure, it is possible to provide an alloyed galvanized steel sheet with excellent resistance to cracking in resistance welding at a welded portion, even if the crystal orientations of an Fe-based electroplating layer and a Si-containing cold-rolled steel sheet are integrated at a high ratio at the interface between the Fe-based electroplating layer and the Si-containing cold-rolled steel sheet.

BRIEF DESCRIPTION OF THE DRAWINGS

In the accompanying drawings:

FIG. 3A illustrates a boundary line at the interface between an Fe-based electroplating layer and a Si-containing cold-rolled steel sheet in a SIM image, FIG. 3B illustrates a boundary line and an area for evaluation in a binarized image, and FIG. 3C is an enlarged view of the area enclosed by a square in FIG. 3B;

DETAILED DESCRIPTION

The following describes embodiments of the present disclosure.

In the following, the units for the content of each element in the chemical composition of the Si-containing cold-rolled steel sheet and the content of each element in the chemical composition of the coated or plated layer are all "mass %", and are simply expressed in "%" unless otherwise specified. As used herein, a numerical range expressed by using "to" means a range including numerical values described before and after "to", as the lower limit value and the upper limit value. As used herein, a steel sheet having "high strength" means that the steel sheet has a tensile strength TS of 590 MPa or higher when measured in accordance with JIS Z 2241 (2011).

The LME cracking described above can be broadly classified into cracking that occurs on the surface in contact with the electrode (hereinafter referred to as "surface cracking") and cracking that occurs near the corona bond between steel sheets (hereinafter referred to as "internal cracking"). It is known that surface cracking is likely to occur in resistance welding at high currents where spatter is generated, and surface cracking can be suppressed by keeping the current within an appropriate range where spatter is not generated. On the other hand, internal cracking occurs even when the current during resistance welding is kept within an appropriate range where spatter is not generated. Surface cracking is easily detected by visual inspection during the manufacturing process, whereas internal cracking is difficult to detect by visual inspection. For these reasons, internal cracking is a particularly significant issue among LME cracking. If resistance welding is performed with the welding electrode at an angle to the steel sheet, residual stresses may increase and internal cracks may form. Since residual stresses are expected to increase as the steel sheet has higher strength, there is concern about internal cracking associated with higher strength of the steel sheet. According to the present disclosure, among the resistance to cracking in resistance welding, the property of preventing such internal cracking can be improved.

Embodiment 1

Figure 1:
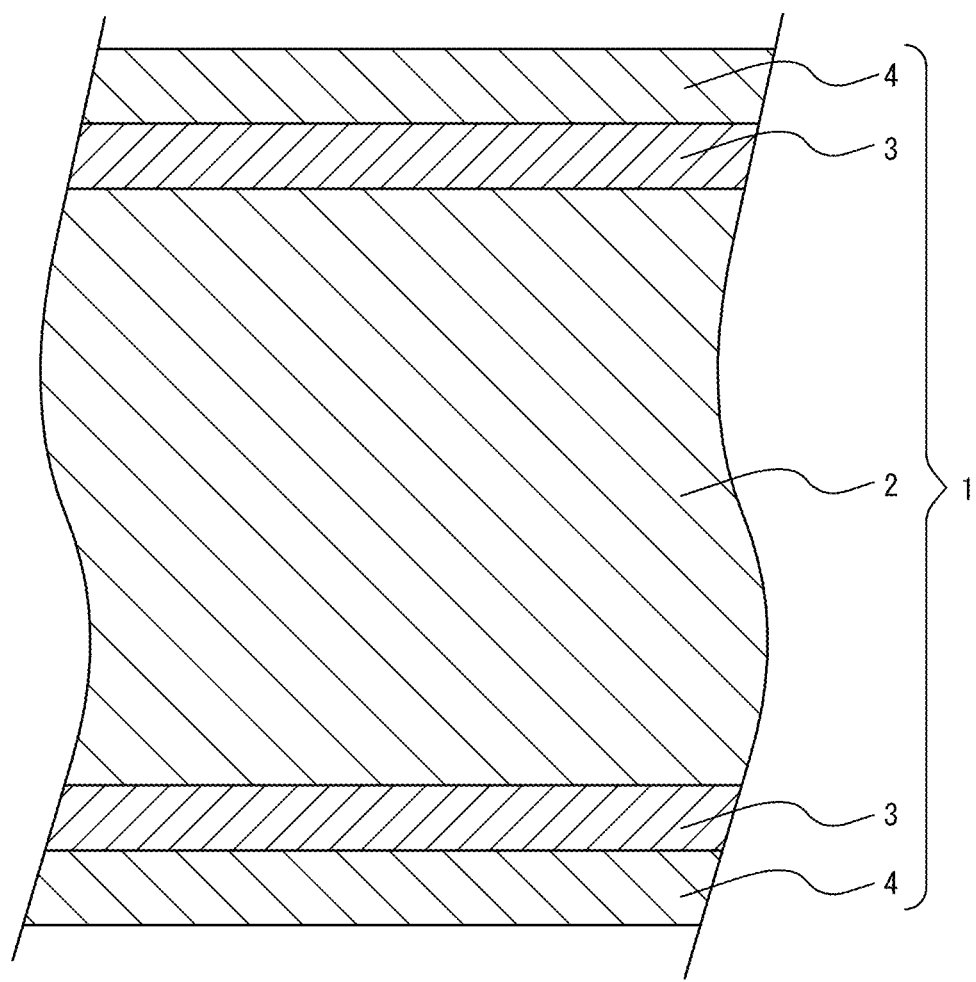
FIG. 1 schematically illustrates a cross section of an alloyed galvanized steel sheet.

FIG. 1 schematically illustrates a cross section of an alloyed galvanized steel sheet 1 according to this embodiment. As illustrated in FIG. 1, the alloyed galvanized steel sheet 1 has an Fe-based electroplating layer 3 on at least one surface of a Si-containing cold-rolled steel sheet 2, and an alloyed galvanized layer 4 formed on the Fe-based electroplating layer. First, the chemical composition of the Si-containing cold-rolled steel sheet will be explained.

Si: 0.1% or More and 3.0% or Less

Si is an effective element for increasing the strength of a steel sheet because it has a large effect of increasing the strength of steel by solid dissolution (i.e., high solid solution strengthening capacity) without significantly impairing formability. On the other hand, Si is also an element that adversely affects the resistance to cracking in resistance welding at a welded portion. When Si is added to increase the strength of a steel sheet, the addition amount needs to be 0.1% or more. When the Si content is less than 0.50%, welding at a conventional hold time of about 0.24 seconds will not cause any problem in terms of resistance to cracking in resistance welding at a welded portion. However, the tact time during spot welding in the assembly process of automotive parts has become an issue from the viewpoint of production cost, and when measures are taken to reduce the hold time, the resistance to cracking in resistance welding at a welded portion may become insufficient even if the Si content is less than 0.50%. On the other hand, if the Si content exceeds 3.0%, hot rolling manufacturability and cold rolling manufacturability are greatly reduced, which may adversely affect productivity and reduce the ductility of the steel sheet itself. Therefore, Si needs to be added in the range of 0.1% to 3.0%. The Si content is preferably 0.50% or more, more preferably 0.7% or more, and even more preferably 0.9% or more, which has a greater effect on the resistance to cracking in resistance welding at a welded portion. Further, the Si content is preferably 2.5% or less, more preferably 2.0% or less, and even more preferably 1.7% or less.

The Si-containing cold-rolled steel sheet in this embodiment is required to contain Si in the above range, yet may contain other components within a range allowable for ordinary cold-rolled steel sheets. The other components are not restricted in any particular way. However, if the Si-containing cold-rolled steel sheet in this embodiment is to be made to have high strength with a tensile strength (TS) of 590 MPa or higher, the following chemical composition is preferred.

C: 0.8% or Less (Exclusive of 0%)

C improves formability by forming, for example, martensite as a steel microstructure. When C is contained, the C content is preferably 0.8% or less, and more preferably 0.3% or less, from the perspective of good weldability. The lower limit of C is not particularly limited. However, to obtain good formability, the C content is preferably more than 0%, more preferably 0.03% or more, and even more preferably 0.08% or more.

Mn: 1.0% or More and 12.0% or Less

Mn is an element that increases the strength of steel by solid solution strengthening, improves quench hardenability, and promotes the formation of retained austenite, bainite, and martensite. These effects are obtained by the addition of Mn in an amount of 1.0% or more. On the other hand, if the Mn content is 12.0% or less, these effects can be obtained without causing an increase in cost. Therefore, the Mn content is preferably 1.0% or more. The Mn content is preferably 12.0% or less. The Mn content is more preferably 1.3% or more, even more preferably 1.5% or more, and most preferably 1.8% or more. The Mn content is more preferably 3.5% or less, and even more preferably 3.3% or less.

P: 0.1% or Less (Exclusive of 0%)

Suppressing the P content can contribute to preventing deterioration of weldability. Suppressing the P content can also prevent P from segregating at grain boundaries, thus preventing degradation of ductility, bendability, and toughness. In addition, adding a large amount of P promotes ferrite transformation, causing an increase in the crystal grain size. Therefore, the P content is preferably 0.1% or less. The lower limit of the P content is not particularly limited, yet may be greater than 0% or 0.001% or more, in terms of production technology constraints.

S: 0.03% or Less (Exclusive of 0%)

The S content is preferably 0.03% or less, and more preferably 0.02% or less. Suppressing the S content can prevent deterioration of weldability as well as deterioration of ductility during hot working, suppress hot cracking, and significantly improve surface characteristics. Furthermore, suppressing the S content can prevent deterioration of ductility, bendability, and stretch flangeability of the steel sheet due to the formation of coarse sulfides as impurity elements. These problems become more pronounced when the S content exceeds 0.03%, and it is preferable to reduce the S content as much as possible. The lower limit of the S content is not particularly limited, yet may be greater than 0% or 0.0001% or more, in terms of production technology constraints.

N: 0.010% or Less (Exclusive of 0%)

The N content is preferably 0.010% or less. By setting the N content to 0.010% or less, it is possible to prevent the effect of the addition of Ti, Nb, and V in increasing the strength of the steel sheet from being lost as a result of N forming coarse nitrides with Ti, Nb, and V at high temperatures. Setting the N content to 0.010% or less can also prevent deterioration of toughness. Furthermore, setting the N content to 0.010% or less can prevent slab cracking and surface defects during hot rolling. The N content is preferably 0.005% or less, more preferably 0.003% or less, and even more preferably 0.002% or less. The lower limit of the N content is not particularly limited, yet may be greater than 0% or 0.0005% or more, in terms of production technology constraints.

Al: 1.0% or Less (Exclusive of 0%)

Since Al is thermodynamically most oxidizable, it oxidizes prior to Si and Mn, suppressing oxidation of Si and Mn at the topmost surface layer of the steel sheet and promoting oxidation of Si and Mn inside the steel sheet. This effect is obtained with an Al content of 0.01% or more. On the other hand, an Al content exceeding 1.0% increases the cost. Therefore, when added, the Al content is preferably 1.0% or less. The Al content is more preferably 0.1% or less. The lower limit of Al is not particularly limited, yet may be greater than 0% or 0.001% or more.

The chemical composition may further optionally contain at least one element selected from the group consisting of B: 0.005% or less, Ti: 0.2% or less, Cr: 1.0% or less, Cu: 1.0% or less, Ni: 1.0% or less, Mo: 1.0% or less, Nb: 0.20% or less, V: 0.5% or less, Sb: 0.200% or less, Ta: 0.1% or less, W: 0.5% or less, Zr: 0.1% or less, Sn: 0.20% or less, Ca: 0.005% or less, Mg: 0.005% or less, and REM: 0.005% or less.

B: 0.005% or Less

B is an effective element in improving the quench hardenability of steel. To improve the quench hardenability, the B content is preferably 0.0003% or more, and more preferably 0.0005% or more. However, since excessive addition of B reduces formability, the B content is preferably 0.005% or less.

Ti: 0.2% or Less

Ti is effective for strengthening of steel by precipitation. The lower limit of Ti is not limited, yet is preferably 0.005% or more to obtain the strength adjustment effect. However, since excessive addition of Ti causes excessive hard phase and reduces formability, the Ti content, when added, is preferably 0.2% or less, and more preferably 0.05% or less.

Cr: 1.0% or Less

The Cr content is preferably 0.005% or more. Setting the Cr content to 0.005% or more improves the quench hardenability and the balance between strength and ductility. When added, the Cr content is preferably 1.0% or less from the viewpoint of preventing cost increase.

Cu: 1.0% or Less

The Cu content is preferably 0.005% or more. Setting the Cu content to 0.005% or more can promote formation of retained γ phase. When added, the Cu content is preferably 1.0% or less from the viewpoint of preventing cost increase.

Ni: 1.0% or Less

The Ni content is preferably 0.005% or more. Setting the Ni content to 0.005% or more can promote formation of retained γ phase. When added, the Ni content is preferably 1.0% or less from the viewpoint of preventing cost increase.

Mo: 1.0% or Less

The Mo content is preferably 0.005% or more. Setting the Mo content to 0.005% or more can yield a strength adjustment effect. When added, the Mo content is preferably 1.0% or less from the viewpoint of preventing cost increase.

Nb: 0.20% or Less

Setting the Nb content to 0.005% or more is effective in increasing strength. When added, the Nb content is preferably 0.20% or less from the viewpoint of preventing cost increase.

V: 0.5% or Less

Setting the V content to 0.005% or more is effective in increasing strength. When added, the V content is preferably 0.5% or less from the viewpoint of preventing cost increase.

Sb: 0.200% or Less

Sb can be contained from the viewpoint of suppressing nitriding and oxidation of the steel sheet surface, or decarburization in an area of several tens of microns on the steel sheet surface caused by oxidation. Sb suppresses nitriding and oxidation of the steel sheet surface, thereby preventing a decrease in the formation of martensite on the steel sheet surface and improving the fatigue resistance and surface quality of the steel sheet. To obtain this effect, the Sb content is preferably 0.001% or more. On the other hand, to obtain good toughness, the Sb content is preferably 0.200% or less.

Ta: 0.1% or Less

Setting the Ta content to 0.001% or more is effective in increasing strength. When added, the Ta content is preferably 0.1% or less from the viewpoint of preventing cost increase.

W: 0.5% or Less

Setting the W content to 0.005% or more is effective in increasing strength. When added, the W content is preferably 0.5% or less from the viewpoint of preventing cost increase.

Zr: 0.1% or Less

Setting the Zr content to 0.0005% or more is effective in increasing strength. When added, the Zr content is preferably 0.1% or less from the viewpoint of preventing cost increase.

Sn: 0.20% or Less

Sn is an effective element in suppressing, for example, denitrification and deboronization, thereby reducing the strength loss of steel. To obtain these effects, the content is preferably 0.002% or more. On the other hand, to obtain good impact resistance, the Sn content is preferably 0.20% or less.

Ca: 0.005% or Less

Setting the Ca content to 0.0005% or more makes it possible to control sulfide morphology and improve ductility and toughness. From the viewpoint of obtaining good ductility, the Ca content is preferably 0.005% or less.

Mg: 0.005% or Less

Setting the Mg content to 0.0005% or more makes it possible to control sulfide morphology and improve ductility and toughness. When added, the Mg content is preferably 0.005% or less from the viewpoint of preventing cost increase.

REM: 0.005% or Less.

Setting the REM content to 0.0005% or more makes it possible to control sulfide morphology and improve ductility and toughness. When added, the REM content is preferably 0.005% or less from the viewpoint of obtaining good toughness.

In the Si-containing cold-rolled steel sheet according to this embodiment, the balance other than the above components is Fe and inevitable impurities.

The following describes an Fe-based electroplating layer formed on at least one surface of an alloyed galvanized steel sheet that is obtained by subjecting the aforementioned Si-containing cold-rolled steel sheet to pre-plating with a pre-annealing Fe-based electroplating layer before forming a galvanized layer thereon, followed by galvanization and the subsequent alloying treatment.

Fe-Based Electroplating Layer: More than 20.0 g/m$^2$

Although the mechanism by which the presence of an Fe-based electroplating layer with a coating weight per surface of more than 20.0 g/m$^2$ after the alloying treatment improves the resistance to cracking in resistance welding at a welded portion is unclear, it is considered as follows. In this embodiment, annealing is performed after forming the Fe-based electroplating layer, which will be described later. By performing annealing after forming the Fe-based electroplating layer, it is possible to suppress the occurrence of scratches called pick-ups on the surface of the Fe-based electroplated steel sheet due to surface oxides of Si and Mn and the like formed during the annealing. On the other hand, the crystal orientations of the Fe-based electroplating layer and the Si-containing cold-rolled steel sheet are integrated at a ratio of more than 50% at the interface between the Fe-based electroplating layer and the Si-containing cold-rolled steel sheet in this case. Accordingly, molten zinc easily penetrates into the crystal grain boundaries in the Si-containing cold-rolled steel sheet via the crystal grain boundaries in the Fe-based electroplating layer. Further, when the alloying treatment is applied to the galvanized layer, the surface layer of the Fe-based electroplating layer is consumed by alloying, making it more difficult to improve the resistance to cracking in resistance welding at a welded portion than in the case of a non-alloyed galvanized steel sheet. Therefore, an Fe-based electroplating layer with a coating weight of more than 20.0 g/m$^2$ after the alloying treatment is formed in this embodiment. Forming an Fe-based electroplating layer with a coating weight of more than 20.0 g/m$^2$ is considered to delay the time for the zinc melted during resistance welding to reach the crystal grain boundaries in the Si-containing cold-rolled steel sheet, which improves the resistance to cracking in resistance welding at a welded portion (hereinafter referred to as the "effect of suppressing the intergranular penetration of zinc"). In addition, the Fe-based electroplating layer functions as a soft layer to relax the stress given to the steel sheet surface during welding and can reduce the residual stress at a resistance-welded portion to improve the resistance to cracking in resistance welding at a welded portion (hereinafter referred to as the "stress relaxation effect"). Further, it is considered that, when there is a large amount of solute Si on the steel sheet surface, the toughness of a welded portion is decreased, and the resistance to cracking in resistance welding at a welded portion is deteriorated. In contrast, it is considered that, when a certain amount or more of an Fe-based electroplating layer is present on the steel sheet surface, the Fe-based electroplating layer acts as a layer deficient in solute Si and reduces the amount of solid dissolution of Si in a welded portion, which suppresses the decrease in toughness of a welded portion due to solid dissolution of Si and improves the resistance to cracking in resistance welding at a welded portion (hereinafter referred to as the "toughness degradation suppression effect"). Although the mechanism by which the effect of suppressing the intergranular penetration of zinc plating, the stress relaxation effect, and the toughness degradation suppression effect obtained by the formation of the Fe-based electroplating layer contribute to the improvement of the resistance to cracking in resistance welding is complicated and not quantitatively clear, it is considered that these effects act in combination to improve the resistance to cracking in resistance welding. In order to obtain the effect of improving the resistance to cracking in resistance welding at a welded portion, the coating weight per surface of the Fe-based electroplating layer needs to be more than 20.0 g/m$^2$ in a galvanized steel sheet after alloying. The upper limit of the coating weight per surface of the Fe-based electroplating layer is not particularly limited, yet is preferably 60.0 g/m$^2$ or less from the cost perspective. The coating weight of the Fe-based electroplating layer is preferably 25.0 g/m$^2$ or more, more preferably 30.0 g/m$^2$ or more, and even more preferably 35.0 g/m$^2$ or more. The alloyed galvanized steel sheet preferably has Fe-based electroplating layers on both front and back surfaces of the Si-containing cold-rolled steel sheet. By setting the coating weight of the Fe-based electroplating layer to 25.0 g/m² or more, particularly good resistance to cracking in resistance welding at a welded portion can be obtained.

The thickness of the Fe-based electroplating layer is measured as follows. A sample of 10 mm×15 mm in size is taken from an alloyed galvanized steel sheet and embedded in resin to make a cross-sectional embedded sample. Three arbitrary locations on the same cross section are observed using a scanning electron microscope (SEM) at an accelerating voltage of 15 kV and a magnification of 2,000× to 10,000× depending on the thickness of the Fe-based electroplating layer. Then, the average thickness in the three fields of view is multiplied by the density of iron to convert the result of observation to the coating weight per surface of the Fe-based electroplating layer.

The Fe-based electroplating layer may be an Fe (pure Fe) plating layer, or an alloy plating layer such as the one formed from Fe—B alloy, Fe—C alloy, Fe—P alloy, Fe—N alloy, Fe—O alloy, Fe—Ni alloy, Fe—Mn alloy, Fe—Mo alloy, Fe—W alloy, or another alloy. Although the chemical composition of the Fe-based electroplating layer is not particularly limited, it is preferable that the chemical composition contain at least one element selected from the group consisting of B, C, P, N, O, Ni, Mn, Mo, Zn, W, Pb, Sn, Cr, V, and Co, in a total amount of 10 mass % or less, with the balance being Fe and inevitable impurities. Setting the total amount of elements other than Fe to 10 mass % or less can prevent a decrease in electrolytic efficiency, making it possible to form an Fe-based electroplating layer at low cost. In the case of Fe—C alloy, the C content is preferably 0.08 mass % or less.

The crystal orientations of the Fe-based electroplating layer and the Si-containing cold-rolled steel sheet needs to be integrated at a ratio of more than 50% at the interface between the Fe-based electroplating layer and the Si-containing cold-rolled steel sheet. This is because, when the crystal orientations of the Fe-based electroplating layer and the Si-containing cold-rolled steel sheet are integrated at a ratio of more than 50% at the interface between the Fe-based electroplating layer and the Si-containing cold-rolled steel sheet, molten zinc easily penetrates into the crystal grain boundaries in the Si-containing cold-rolled steel sheet via the crystal grain boundaries in the Fe-based electroplating layer, and the effect of providing an Fe-based electroplating layer according to this embodiment becomes more pronounced. For the alloyed galvanized steel sheet of this embodiment, the crystal orientations of the Fe-based electroplating layer and the Si-containing cold-rolled steel sheet may be integrated at a ratio of 70% or more or even 75% or more at the interface between the Fe-based electroplating layer and the Si-containing cold-rolled steel sheet. The crystal orientations of the Fe-based electroplating layer and the Si-containing cold-rolled steel sheet may be integrated at a ratio of 100% at the interface between the Fe-based electroplating layer and the Si-containing cold-rolled steel sheet, where the upper limit of the ratio is not particularly limited.

As described above, when the ratio at which the crystal orientations of the Fe-based electroplating layer and the Si-containing cold-rolled steel sheet are integrated at the interface between the Fe-based electroplating layer and the Si-containing cold-rolled steel sheet increases, it becomes easier for molten zinc to penetrate into the crystal grain boundaries in the Si-containing cold-rolled steel sheet via the crystal grain boundaries in the Fe-based electroplating layer. This tendency is particularly pronounced when the crystal orientations of the Fe-based electroplating layer and the Si-containing cold-rolled steel sheet are integrated at a ratio of more than 50% at the interface between the Fe-based electroplating layer and the Si-containing cold-rolled steel sheet. In this embodiment, the crystal orientations of the Fe-based electroplating layer and the Si-containing cold-rolled steel sheet are integrated at a high ratio because the Si-containing cold-rolled steel sheet is subjected to Fe-based electroplating and then annealing, and it is annealed in a low dew-point atmosphere as described below. Therefore, forming an Fe-based electroplating layer with a coating weight of more than 20.0 g/m² is expected to delay the penetration of molten zinc into the crystal grain boundaries in the Si-containing cold-rolled steel sheet via the crystal grain boundaries in the Fe-based electroplating layer, which is expected to further improve the resistance to cracking in resistance welding at a welded portion.

Figure 2A:
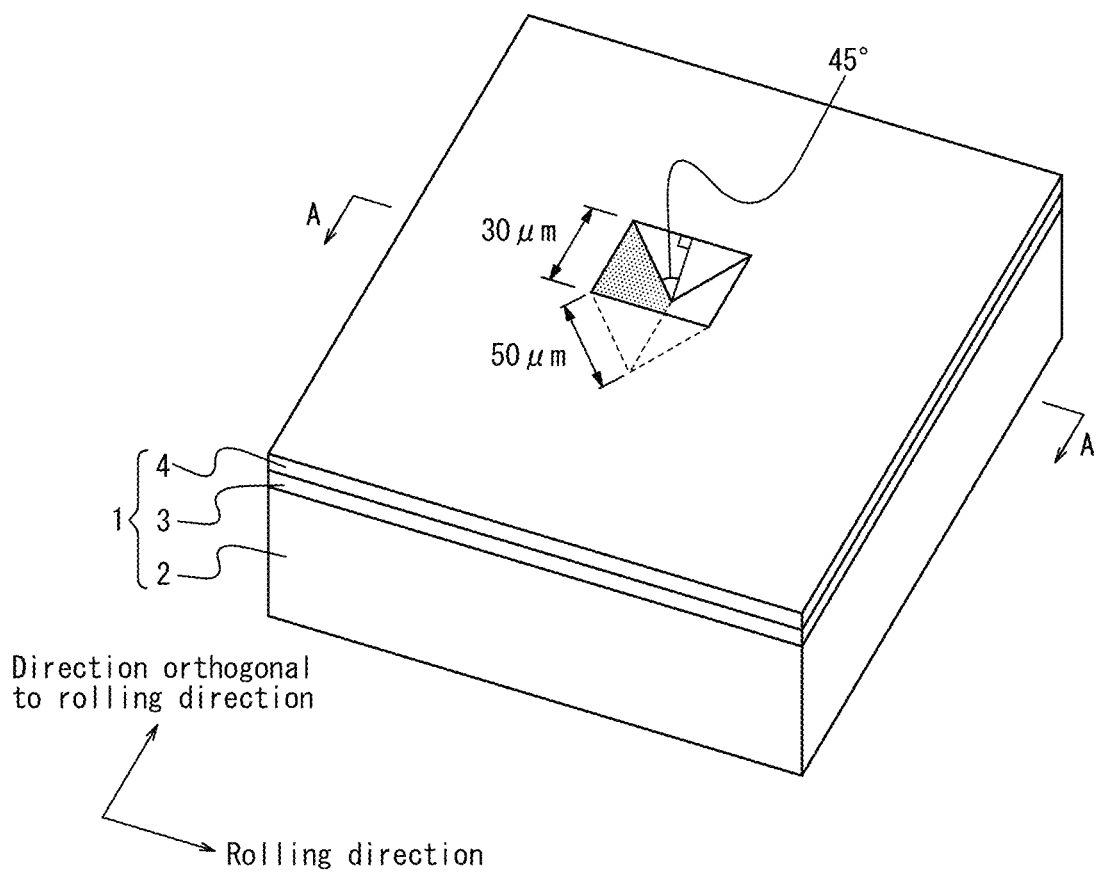
FIG. 2A is an oblique overview of a sample for observation to measure the ratio of integrated crystal orientations.
Figure 2B:
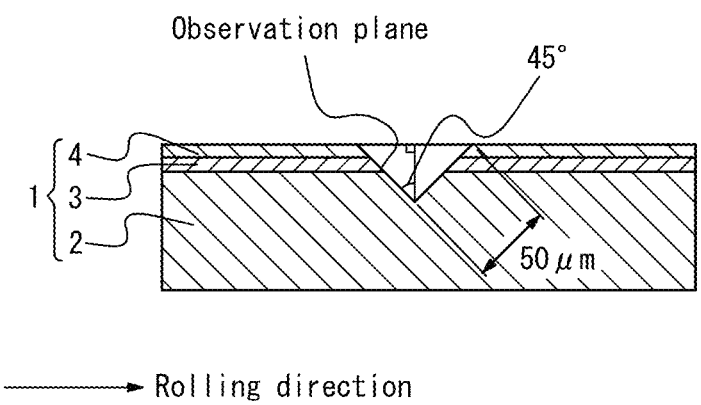
FIG. 2B is an A-A cross section of the sample for observation.

The ratio at which the crystal orientations of the Fe-based electroplating layer and the Si-containing cold-rolled steel sheet are integrated at the interface between the Fe-based electroplating layer and the Si-containing cold-rolled steel sheet is measured as follows. A sample of 10 mm×10 mm in size is taken from an alloyed galvanized steel sheet. Any part of the sample is processed with a focused ion beam (FIB) device to form, at the processed part, a 45° cross section at an angle of 45° relative to the direction of a T-section (i.e., a cross section parallel to a direction orthogonal to the rolling direction of the steel sheet and perpendicular to the steel sheet surface) with a width of 30 μm in a direction orthogonal to the rolling direction and a length of 50 μm in a direction 45° relative to the T-section direction. The 45° cross section thus formed is used as a sample for observation. FIGS. 2A and 2B schematically illustrate the sample for observation. FIG. 2A is an oblique view of the sample for observation. FIG. 2B is an A-A cross section of the sample for observation illustrated in FIG. 2A. Then, using a scanning ion microscope (SIM), the center of the 45° cross section of the sample for observation is observed at a magnification of 5000× to capture an 8-bit SIM image with a width of 1024 pixels and a height of 943 pixels. Using the SIM images taken at each 45° cross section, the ratio at which the crystal orientations of the Fe-based electroplating layer and the Si-containing cold-rolled steel sheet are integrated at the interface between the Fe-based electroplating layer and the Si-containing cold-rolled steel sheet is determined based on the following equation (2). The result is rounded up to an integer.

(Ratio at which the crystal orientations of the Fe-based electroplating layer and the Si-containing cold-rolled steel sheet are integrated at the interface between the Fe-based electroplating layer and the Si-containing cold-rolled steel sheet)=(Length of the area where the crystal orientations of the Fe-based electroplating layer and the Si-containing cold-rolled steel sheet are integrated on the interface between the Fe-based electroplating layer and the Si-containing cold-rolled steel sheet)/(Length of the interface in the observation field of view)×100   (2)

Figure 3A:
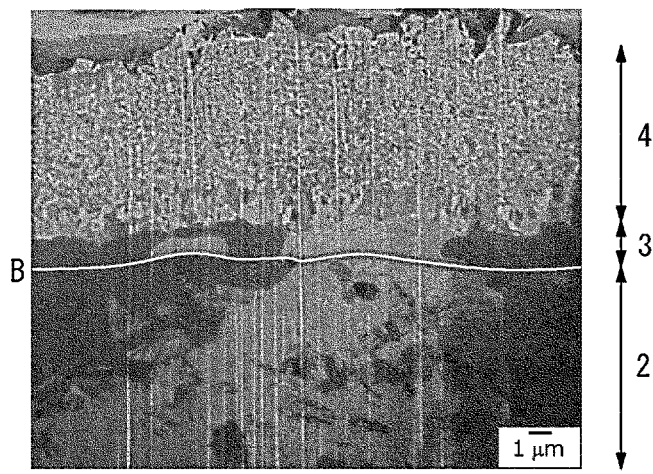
FIGS. 3A to 3C illustrate a method of evaluating the ratio of integrated crystal orientations, where
Figure 3B:
Figure 3B:
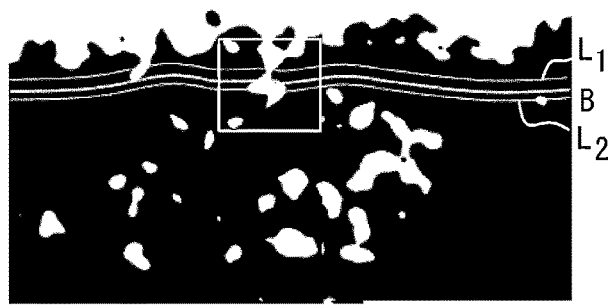
Figure 3C:
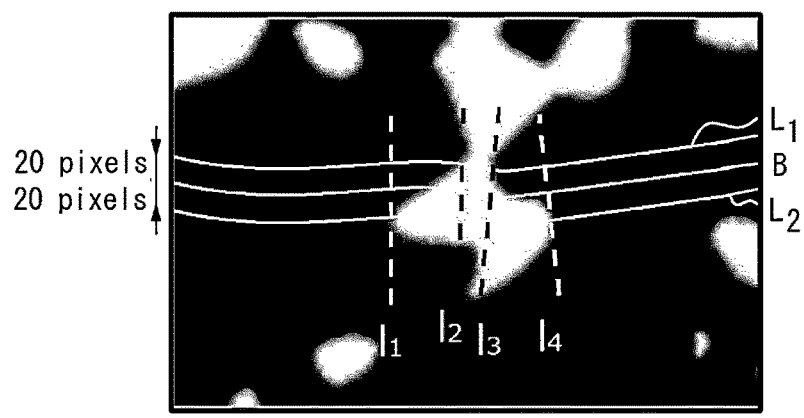

Whether the crystal orientations of the Fe-based electroplating layer and the Si-containing cold-rolled steel sheet are integrated at the interface between the Fe-based electroplating layer and the Si-containing cold-rolled steel sheet or not is determined by image processing. FIGS. 3A to 3C are used to illustrate a method of evaluating the ratio of integrated crystal orientations. First, as illustrated in FIG. 3A, a boundary line B is drawn on the interface between the Fe-based electroplating layer 3 and the Si-containing cold-rolled steel sheet 2 in the aforementioned SIM image using a scanning electron microscope. Next, an image-processed SIM image is created separately from the image in which the boundary line has been drawn. Specifically, the crystal grain boundaries are first emphasized by the Sobel filter on the captured 8-bit SIM image with a width of 1024 pixels and a height of 943 pixels. The image in which the crystal grain boundaries have been emphasized is then smoothed by the Gaussian filter (where the radius (R) is 10 pixels). Next, binarization (where the threshold is 17) is performed on the image after smoothing. Next, the boundary line B in the image where the interface has been depicted is transferred to the binarized image. Next, as illustrated in FIG. 3B, in the image after binarization, an area for evaluation with a width of 40 pixels centered on the boundary line B (the area enclosed by $L_1$ and $L_2$ in FIG. 3B) is drawn along the boundary line B in the binarized image. The total length where the interface between the Fe-based electroplating layer and the Si-containing cold-rolled steel sheet (the black-and-white boundary on the binarized image) does not exist in the area for evaluation along the length of the boundary line B is regarded as the length of the area where the crystal orientations are integrated. The total length where the interface between the Fe-based electroplating layer and the Si-containing cold-rolled steel sheet does not exist in the area for evaluation along the length of the boundary line is determined as follows. First, locations where the area for evaluation can be divided into substantially rectangular parts where only one of black and white is included by two normal lines of the boundary line B are found out in the entire area for evaluation. Next, the maximum distance between the intersections of the boundary line and the two normal lines in those locations is summed over the entire area for evaluation, and the result is regarded as the total length where the interface between the Fe-based electroplating layer and the Si-containing cold-rolled steel sheet does not exist in the area for evaluation along the length of the boundary line. The length of the area where the crystal orientations are integrated may be determined by subtracting the length of the area where the crystal orientations are not integrated from the length of the interface in the observation field of view. For explanation, FIG. 3C illustrates an enlarged view of the area enclosed by the square in FIG. 3B. First, as illustrated in FIG. 3C, locations where the area for evaluation can be divided into substantially rectangular parts where two colors, black and white, are included by the two normal lines of the boundary line B (i.e. $l_1$ and $l_2$, and $l_3$ and $l_4$ in FIG. 3(C)) are found out in the entire area for evaluation. Next, the maximum distance between the intersections of the boundary line and the two normal lines in those locations is summed over the entire area for evaluation, and the result is regarded as the total length where the interface between the Fe-based electroplating layer and the Si-containing cold-rolled steel sheet exists in the area for evaluation along the length of the boundary line. By subtracting this length, i.e., the length of the area where the crystal orientations are not integrated, from the length of the interface in the observation field of view, the length of the area where the crystal orientations are integrated can be determined.

Figure 4:
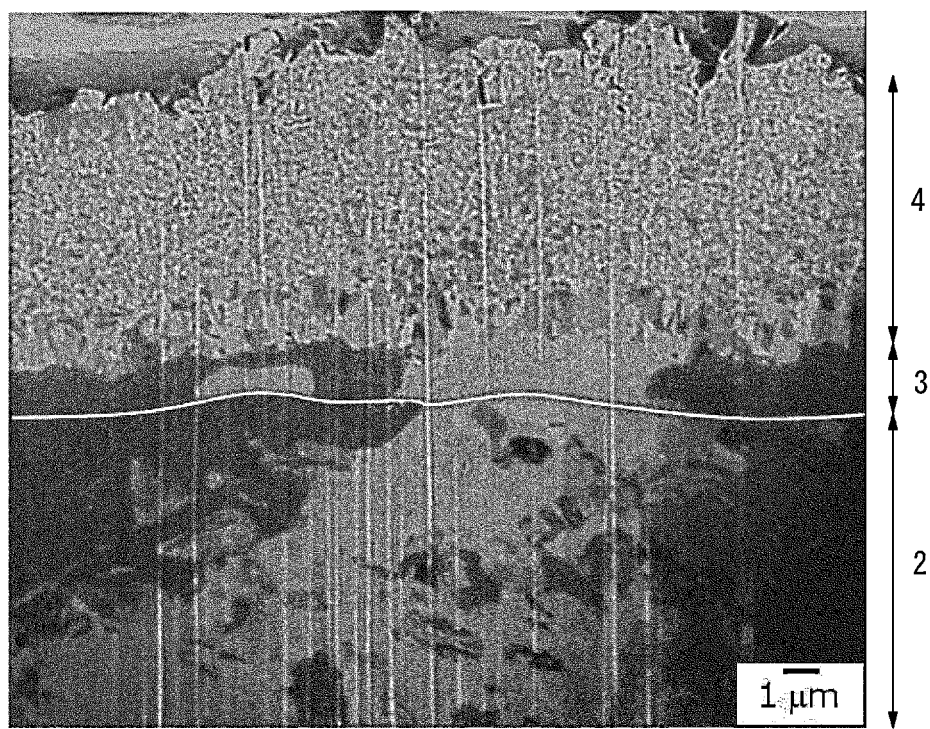
FIG. 4 illustrates an image for observing the interface between the Fe-based electroplating layer and the Si-containing cold-rolled steel sheet in Comparative Example No. 30.
Figure 5:
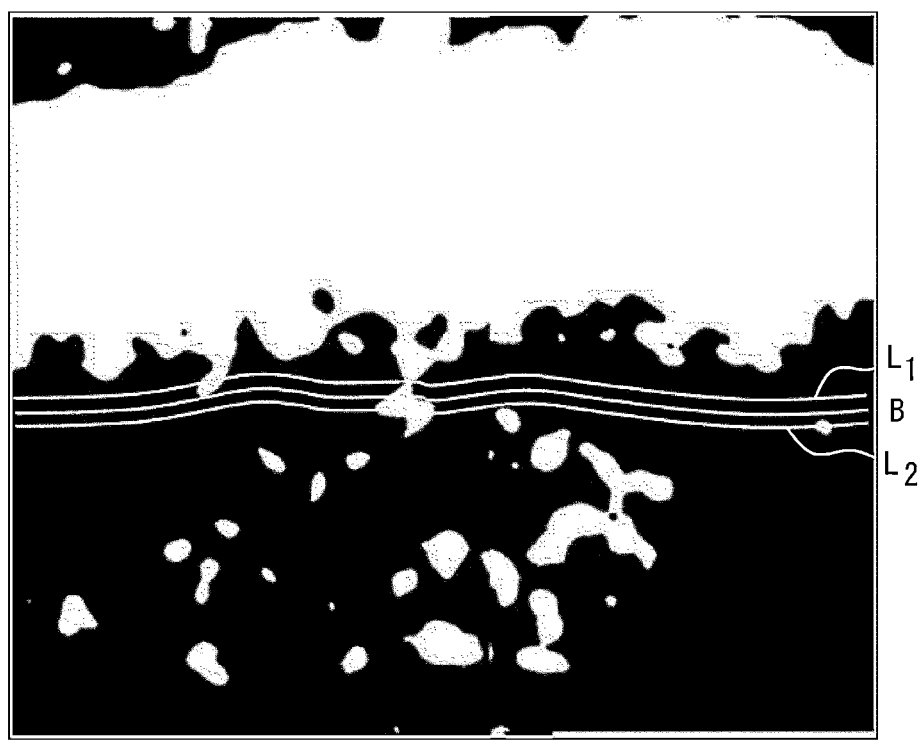
FIG. 5 illustrates an image of the interface between the Fe-based electroplating layer and the Si-containing cold-rolled steel sheet in Comparative Example No. 30, where a binarized boundary line and a binarized area for evaluation are depicted.
Figure 6:
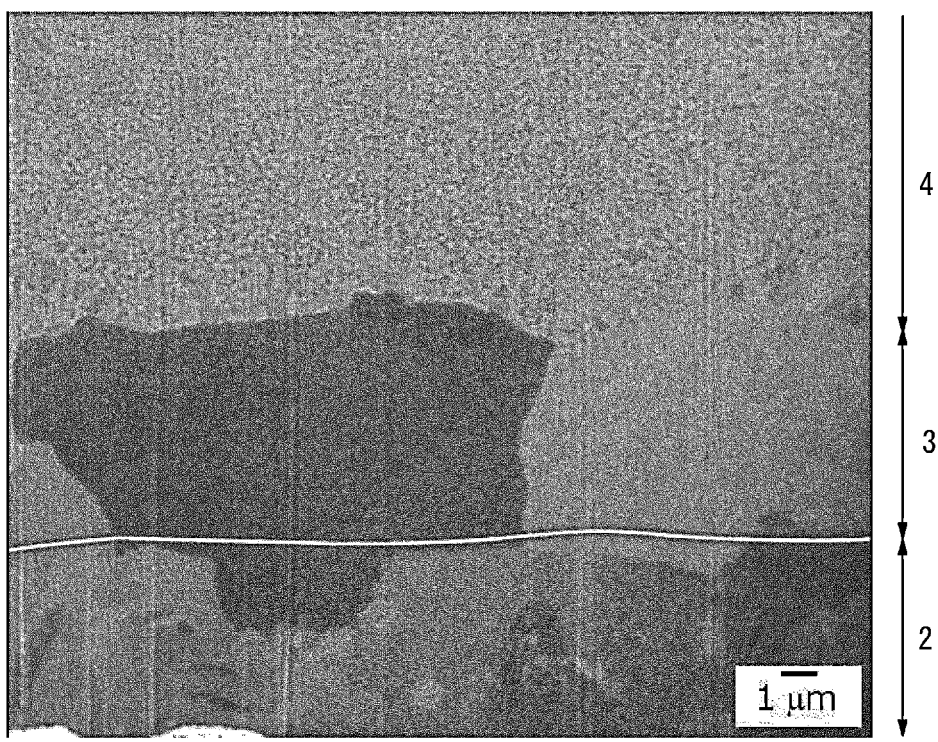
FIG. 6 illustrates an image for observing the interface between the Fe-based electroplating layer and the Si-containing cold-rolled steel sheet in Example No. 31.
Figure 7:
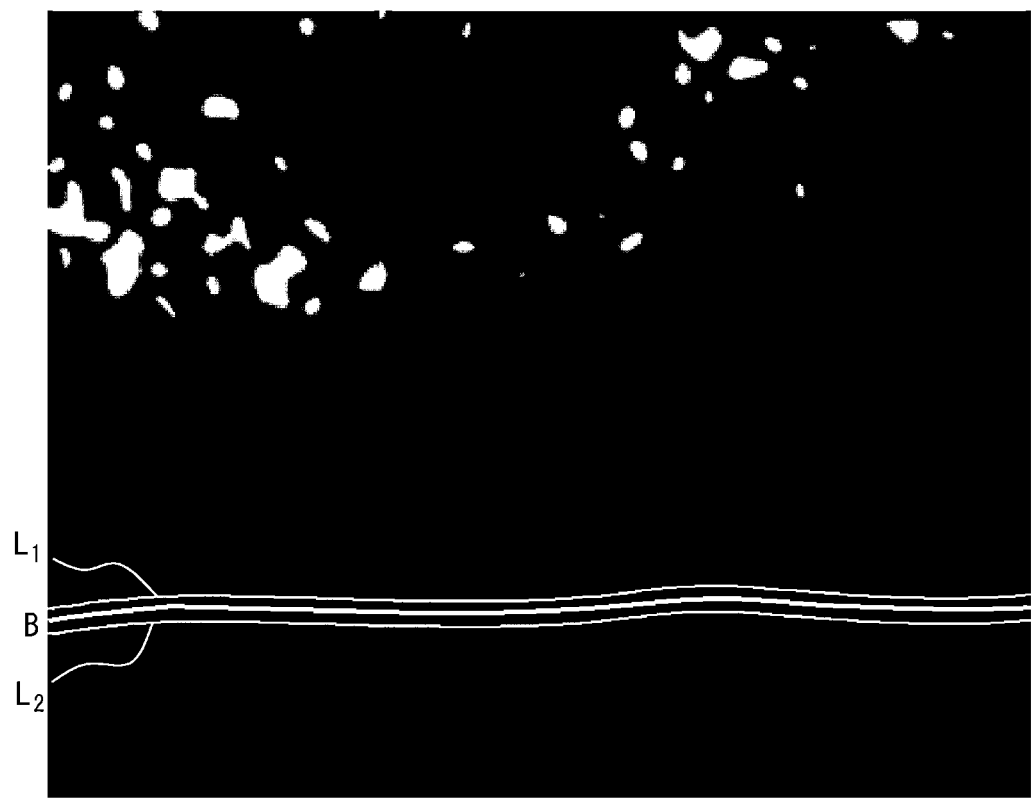
FIG. 7 illustrates an image of the interface between the Fe-based electroplating layer and the Si-containing cold-rolled steel sheet in Example No. 31, where a binarized boundary line and a binarized area for evaluation are depicted.

FIG. 4 illustrates a SIM image of the interface between the Fe-based electroplating layer and the Si-containing cold-rolled steel sheet for Comparative Example No. 30 described below. FIG. 5 illustrates an image after the SIM image has been subjected to image processing and binarization processing as described above. In Comparative Example No. 30, the crystal orientations of the Fe-based electroplating layer and the Si-containing cold-rolled steel sheet were integrated at a ratio of 97% at the interface between the Fe-based electroplating layer and the Si-containing cold-rolled steel sheet. Further, FIG. 6 illustrates a SIM image of the interface between the Fe-based electroplating layer and the Si-containing cold-rolled steel sheet for Example No. 31 described below. FIG. 7 illustrates an image after the SIM image has been subjected to image processing and binarization processing as described above. In Example No. 31, the crystal orientations of the Fe-based electroplating layer and the Si-containing cold-rolled steel sheet were integrated at a ratio of 100% at the interface between the Fe-based electroplating layer and the Si-containing cold-rolled steel sheet.

Next, an alloyed galvanized layer formed on the aforementioned Fe-based electroplating layer will be described. As used herein, the "alloyed galvanized layer" means a zinc layer formed on the surface of the steel sheet after alloying treatment. The "alloyed galvanized layer" is not limited to a layer formed by plating, coating, thermal spraying, cold spraying, or other zinc layer formation methods, but includes any zinc layers that are formed on the surface of the steel sheet after alloying treatment. The alloyed galvanized layer may include at least one selected from the group consisting of C phase, Si phase, F phase, and $F_1$ phase.

While forming an alloyed galvanized layer on the steel sheet surface can provide excellent corrosion resistance, it is generally difficult to improve the resistance to cracking in resistance welding at a welded portion because zinc melted during resistance welding may penetrate into the crystal grain boundaries in the Si-containing cold-rolled steel sheet via the crystal grain boundaries in the Fe-based electroplating layer. As mentioned above, by forming an Fe-based electroplating layer, with a coating weight per surface of more than 20.0 $g/m^2$, on an alloyed galvanized steel sheet that is obtained by applying, before the formation of a galvanized layer, pre-plating with a pre-annealing Fe-based electroplating layer on the surface of the cold-rolled steel sheet before subjection to the annealing process and after the cold rolling, followed by galvanization and the subsequent alloying treatment, it is possible to improve the resistance to cracking in resistance welding at a welded portion in the alloyed galvanized steel sheet. The composition of the alloyed galvanized layer is not limited, and the alloyed galvanized layer may be composed of, for example, Al, Zn, Fe, and inevitable impurities. The Al content in the alloyed galvanized layer is not specified. However, in one example, the Al content is 0.05 mass % or more and 0.250 mass % or less. The Fe content in the alloyed galvanized layer is not specified, either. However, in one example, the Fe content is 7.0 mass % or more and 15.0 mass % or less.

The coating weight per surface of the alloyed galvanized layer is not specified, and it may be 25 $g/m^2$ or more and 80 $g/m^2$ or less. By setting the coating weight per surface of the alloyed galvanized layer to 25 $g/m^2$ or more, the corrosion resistance can be further improved and the coating weight can be easily controlled. By setting the coating weight per surface of the alloyed galvanized layer to 80 $g/m^2$ or less, good coating or plating adhesion is obtained.

According to the present disclosure, it is possible to provide a high-strength alloyed galvanized steel sheet with a tensile strength TS of 590 MPa or more when measured in accordance with JIS Z 2241 (2011). The strength of the alloyed galvanized steel sheet is more preferably 800 MPa or more.

The thickness of the alloyed galvanized steel sheet in this embodiment is not particularly limited, yet may usually be 0.5 mm or more and 3.2 mm or less.

<Method of Producing Alloyed Galvanized Steel Sheet>

Next, a method of producing an alloyed galvanized steel sheet will be described.

A method of producing an alloyed galvanized steel sheet according to one embodiment may be a method of producing an alloyed galvanized steel sheet comprising:

subjecting a cold-rolled steel sheet containing Si in an amount of 0.1 mass % or more and 3.0 mass % or less to Fe-based electroplating to obtain a pre-annealing Fe-based electroplated steel sheet with a pre-annealing Fe-based electroplating layer formed on at least one surface thereof;

then subjecting the pre-annealing Fe-based electroplated steel sheet to annealing in an atmosphere with a dew point of −30° C. or lower to obtain an Fe-based electroplated steel sheet;

then subjecting the Fe-based electroplated steel sheet to galvanization to obtain a galvanized steel sheet; and then further subjecting the galvanized steel sheet to alloying treatment to obtain an alloyed galvanized steel sheet comprising an Fe-based electroplating layer having a coating weight per surface of more than 20.0 g/ma.

First, a cold-rolled steel sheet containing Si in an amount of 0.1 mass % or more and 3.0 mass % or less is produced. The cold-rolled steel sheet may contain Si in an amount of 0.50 mass % or more and 3.0 mass % or less. Regarding the method of producing a cold-rolled steel sheet, conventional methods may be followed. In one example, a cold-rolled steel sheet is produced by hot rolling a steel slab having the chemical composition described above to obtain a hot-rolled sheet, subjecting the hot-rolled sheet to acid cleaning, and then cold rolling the hot-rolled sheet to obtain a cold-rolled steel sheet.

Next, the surface of the cold-rolled steel sheet is subjected to Fe-based electroplating to obtain a pre-annealing Fe-based electroplated steel sheet with a pre-annealing Fe-based electroplating layer formed on at least one surface thereof. The Fe-based electroplating is not limited to a particular method. For example, a sulfuric acid bath, a hydrochloric acid bath, or a mixture of the two can be used as an Fe-based electroplating bath. The term "pre-annealing Fe-based electroplated steel sheet" means that the Fe-based electroplating layer has not undergone an annealing process, and does not exclude the cold-rolled steel sheet having been annealed before subjection to Fe-based electroplating.

The coating weight of the pre-annealing Fe-based electroplating layer is adjusted so that the coating weight per surface of the Fe-based electroplating layer in the alloyed galvanized steel sheet obtained after subjection to the alloying treatment is more than 20.0 g/m². The coating weight of the pre-annealing Fe-based electroplating layer can be adjusted by the current passage time and so on.

The coating weight (g/m²) per surface of the pre-annealing Fe-based electroplating layer, denoted by $C.W._{Fe0}$, preferably satisfies the following formula (1):

$$(C.W._{Fe0}) > 20.0 + (C.W._{Zn}) \times [mass\%Fe]/100 \quad (1)$$

where $C.W._{Zn}$ denotes a target value of a coating weight (g/m²) per surface of the alloyed galvanized layer, provided:

$$25.0 \text{ g/m}^2 \leq C.W._{Zn} \leq 80.0 \text{ g/m}^2, \text{ and}$$

[mass % Fe] denotes a target value of an Fe content (mass %) in the alloyed galvanized layer.

In other words, if the pre-annealing Fe-based electroplating layer is formed in an amount exceeding the target value (g/m²) of the Fe content+20.0 (g/m²) in the alloyed galvanized layer of the alloyed galvanized steel sheet, it is possible to finally obtain an Fe-based electroplating layer in an amount exceeding 20.0 g/m².

In this case, the target value $C.W._{Zn}$ of the coating weight per surface of the alloyed galvanized layer of the alloyed galvanized steel sheet and the target value of the Fe content in the alloyed galvanized layer are determined by the specifications preset for each application. In addition, the coating weight per surface of the Fe-based electroplating layer here can be calculated by the cross-sectional observation described above.

The Fe ion content in the Fe-based electroplating bath before the start of current passage is preferably 0.5 mol/L or more as $Fe^{2+}$. If the Fe ion content in the Fe-based electroplating bath is 0.5 mol/L or more as $Fe^{2+}$, a sufficient Fe coating weight can be obtained. In order to obtain a sufficient Fe coating weight, the Fe ion content in the Fe-based electroplating bath before the start of current passage is preferably 2.0 mol/L or less.

The Fe-based electroplating bath may contain Fe ions and at least one element selected from the group consisting of B, C, P, N, O, Ni, Mn, Mo, Zn, W, Pb, Sn, Cr, V, and Co. The total content of these elements in the Fe-based electroplating bath is preferably adjusted so that the total content of these elements in the pre-annealing Fe-based electroplating layer is 10 mass % or less. Metallic elements may be contained as metal ions, while non-metallic elements may be contained as part of, for example, boric acid, phosphoric acid, nitric acid, or organic acid. The iron sulfate plating solution may also contain conductivity aids such as sodium sulfate and potassium sulfate, chelating agents, or pH buffers.

Other conditions for the Fe-based electroplating bath are not limited. The temperature of the Fe-based electroplating solution is preferably 30° C. or higher, and it is preferably 85° C. or lower, for constant temperature retention. Although the pH of the Fe-based electroplating bath is not specified, it is preferably 1.0 or more from the viewpoint of preventing a decrease in current efficiency due to hydrogen generation. In addition, it is preferably 3.0 or less considering the electrical conductivity of the Fe-based electroplating bath. The current density is preferably 10 A/dm² or higher for productivity. It is preferably 150 A/dm² or lower for ease of control of coating weight of the Fe-based electroplating layer. The sheet passing speed is preferably 5 mpm or higher for productivity. It is preferably 150 mpm or lower for stable control of coating weight.

Prior to the Fe-based electroplating, degreasing and water washing may be performed to clean the surface of the cold-rolled steel sheet, and acid cleaning and water washing may also be performed to activate the surface of the cold-rolled steel sheet. Following these pretreatments, Fe-based electroplating is performed. The methods of degreasing and water washing are not limited, and conventional methods may be followed. Various acids such as sulfuric acid, hydrochloric acid, nitric acid, and mixtures of these acids can be used in the acid cleaning. Among these preferred are sulfuric acid, hydrochloric acid, or a mixture of these. Although the acid concentration is not specified, approximately 1 mass % to 20 mass % is preferable considering the ability to remove oxide coating and the prevention of rough skin (surface defects) due to over acid cleaning. The acid cleaning solution may also contain, for example, a defoamer, an acid cleaning promoter, or an acid cleaning inhibitor.

Then, after the Fe-based electroplating, the pre-annealing Fe-based electroplated steel sheet is subjected to an annealing process in which the steel sheet is held in a temperature range of 650° C. to 900° C. for 30 seconds to 600 seconds in a reducing atmosphere with a dew point of −30° C. or lower and a hydrogen concentration from 1.0 vol. % to 30.0 vol. %, and then cooled to obtain an Fe-based electroplated steel sheet. The annealing process is performed to increase the strength of the steel sheet by relieving the stress in the pre-annealing Fe-based electroplated steel sheet caused by the rolling process and recrystallizing the microstructure of the pre-annealing Fe-based electroplated steel sheet.

Dew Point: −30° C. or Lower

In this embodiment, the dew point of the annealing atmosphere in the annealing process is a low dew point of −30° C. or lower, which is a condition that requires no additional equipment such as humidification equipment. It is preferable to control the dew point to −30° C. or lower in a temperature range of 650° C. to 900° C. According to our original study, we have found that there is a correlation between the ratio at which the crystal orientations of the Fe-based electroplating layer and the Si-containing cold-rolled steel sheet are integrated at the interface between the Fe-based electroplating layer and the Si-containing cold-rolled steel sheet and the dew point of the annealing atmosphere in the annealing process after the formation of the Fe-based electroplating layer. We found that, when the pre-annealing Fe-based electroplated steel sheet is subjected to annealing after the formation of the Fe-based electroplating layer, the ratio at which the crystal orientations of the Fe-based electroplating layer and the Si-containing cold-rolled steel sheet are integrated of the Fe-based electroplated steel sheet obtained after annealing increases as the dew point of the annealing atmosphere decreases, and the ratio at which the crystal orientations of the Fe-based electroplating layer and the Si-containing cold-rolled steel sheet are integrated decreases as the dew point of the annealing atmosphere increases. The reason why there is such a correlation between the ratio at which the crystal orientations of the Fe-based electroplating layer and the Si-containing cold-rolled steel sheet are integrated and the dew point is not clear, but can be inferred as follows. In the case of a high dew point not lower than a certain temperature, elements that diffuse from the steel sheet to the Fe-based electroplating layer during annealing form oxides inside the Fe-based electroplating layer, and these oxides inhibit the growth of crystal grains of the Fe-based electroplating layer and make the grains finer. On the other hand, if annealing is performed in an atmosphere with a low dew point after the formation of the Fe-based electroplating layer, the abovementioned oxides are less likely to form, and the crystal grains of the Fe-based electroplating layer are coarsened. Therefore, it is considered that the crystal orientation of the Fe-based electroplating layer integrates with the crystal orientation of the Si-containing cold-rolled steel sheet at a high ratio when annealing is performed at a low dew point. When the dew point of the annealing atmosphere in the annealing process is set to −30° C. or lower considering, for example, costs of humidification equipment in an annealing furnace, the ratio at which the crystal orientations of the Fe-based electroplating layer and the Si-containing cold-rolled steel sheet are integrated at the interface between the Fe-based electroplating layer and the Si-containing cold-rolled steel sheet increases. Accordingly, in the case of an alloyed galvanized steel sheet, zinc melted during resistance welding easily penetrates into the crystal grain boundaries in the Si-containing cold-rolled steel sheet via the crystal grain boundaries in the Fe-based electroplating layer. In this embodiment, forming an Fe-based electroplating layer with a certain coating weight delays the time for the zinc melted during resistance welding to reach the crystal grain boundaries in the Si-containing cold-rolled steel sheet via the crystal grain boundaries in the Fe-based electroplating layer, thereby improving the resistance to cracking in resistance welding at a welded portion. The lower limit of the dew point of the annealing atmosphere is not specified, yet it is preferably −80° C. or higher because it is industrially difficult to achieve a dew point lower than −80° C. The dew point of the annealing atmosphere is more preferably −55° C. or higher.

Hydrogen Concentration: 1.0 Vol. % or More and 30.0 Vol. % or Less

The annealing process is performed in a reducing atmosphere with a hydrogen concentration of 1.0 vol. % or more and 30.0 vol. % or less. Hydrogen plays a role in suppressing the oxidation of Fe on the surface of the pre-annealing Fe-based electroplated steel sheet during the annealing process and activating the steel sheet surface. If the hydrogen concentration is 1.0 vol. % or more, it is possible to avoid the deterioration of the coating or plating adhesion, which would otherwise be caused by the oxidation of Fe on the steel sheet surface when a galvanized layer is formed as described below. Therefore, the annealing process is performed in a reducing atmosphere with a hydrogen concentration of preferably 1.0 vol. % or more, and more preferably 2.0 vol. % or more. Although the upper limit of the hydrogen concentration in the annealing process is not particularly limited, from the cost perspective, the hydrogen concentration is preferably 30.0 vol. % or less, and more preferably 20.0 vol. % or less. The balance of the annealing atmosphere other than hydrogen is preferably nitrogen.

Holding Time in Temperature Range of 650° C. to 900° C.: 30 Seconds to 600 Seconds In the annealing process, the holding time in the temperature range of 650° C. to 900° C. is preferably from 30 seconds to 600 seconds. By setting the holding time in this temperature range to 30 seconds or more, the natural oxide layer of Fe formed on the surface of the pre-annealing Fe-based electroplating layer can be suitably removed, and the coating or plating adhesion can be improved when a galvanized layer is formed on the surface of the Fe-based electroplated steel sheet as described below. Therefore, the holding time in this temperature range is preferably 30 seconds or more. The upper limit of the holding time in this temperature range is not specified, yet from the viewpoint of productivity, the holding time in this temperature range is preferably 600 seconds or less.

Maximum Arrival Temperature of Pre-Annealing Fe-Based Electroplated Steel Sheet: 650° C. to 900° C.

The maximum arrival temperature of the pre-annealing Fe-based electroplated steel sheet is not particularly limited, yet it is preferably from 650° C. to 900° C. By setting the maximum arrival temperature of the pre-annealing Fe-based electroplated steel sheet to 650° C. or higher, recrystallization of the microstructure of the steel sheet can suitably proceed and the desired strength can be obtained. In addition, the natural oxide layer of Fe formed on the surface of the pre-annealing Fe-based electroplating layer can be suitably reduced, improving the coating or plating adhesion when performing galvanization on the surface of the Fe-based electroplated steel sheet as described below. In addition, by setting the maximum arrival temperature of the Fe-based electroplated steel sheet to 900° C. or lower, the diffusion rate of Si and Mn in the steel is prevented from increasing too much and the diffusion of Si and Mn to the steel sheet surface can be prevented, making it possible to improve the coating or plating adhesion when performing galvanization on the surface of the Fe-based electroplated steel sheet as described below. If the maximum arrival temperature is 900° C. or lower, damage to the heat treatment furnace can be prevented and costs can be reduced. Therefore, the maximum arrival temperature of the cold-rolled steel sheet is preferably 900° C. or lower. The above maximum arrival temperature is based on the temperature measured on the surface of the cold-rolled steel sheet.

Next, the galvanization treatment will be described.

After the annealing process, the Fe-based electroplated steel sheet is subjected to galvanization treatment. The galvanization treatment is not limited to a particular method, yet may be, for example, hot dip coating, electroplating, cold spraying, or plasma spraying. In the case of hot-dip galvanization, in one example, the Fe-based electroplated steel sheet may be cooled after subjection to the annealing process and immersed in a hot-dip galvanizing bath to apply hot-dip galvanization to the steel sheet surface. The hot-dip galvanizing bath is composed of Al, Zn, and inevitable impurities. The composition of the hot-dip galvanizing bath is not specified. However, in general, the Al concentration in the bath is 0.05 mass % or more and 0.250 mass % or less. If the Al concentration in the bath is 0.05 mass % or more, bottom dross can be prevented, and thus dross can be prevented from causing a defect by adhering to the steel sheet. In addition, setting the Al concentration in the bath to 0.250 mass % or less prevents an increase in top dross and prevents dross from causing a defect by adhering to the steel sheet, while also reducing costs. Other conditions of the hot-dip galvanizing treatment are not restricted. However, for example, the bath temperature of the hot-dip galvanizing bath is normally set in the range of 440° C. to 500° C., and the steel sheet is immersed in the hot-dip galvanizing bath with the sheet temperature adjusted in the range of 440° C. to 550° C.

The coating weight per surface of the galvanized layer is preferably controlled to an amount so that the coating weight per surface of the alloyed galvanized layer is 25 g/m$^2$ to 80 g/m$^2$. By setting the coating weight per surface of the alloyed galvanized layer to 25 g/m$^2$ or more, the corrosion resistance can be further improved and the coating weight can be easily controlled. By setting the coating weight per surface of the alloyed galvanized layer to 80 g/m$^2$ or less, good coating or plating adhesion is obtained.

After the galvanization treatment, the coating weight may be adjusted accordingly. The method of adjusting the coating weight is not limited. However, for example, in the case of hot-dip galvanizing, the coating weight is generally adjusted by gas wiping. In one example, the coating weight is adjusted by the gas pressure of gas wiping and the distance between the wiping nozzle and the steel sheet.

After the galvanization treatment, the steel sheet is further subjected to alloying treatment to obtain an alloyed galvanized steel sheet. Through the alloying treatment, the galvanized layer is heated and alloyed. The alloying treatment is preferably performed at a temperature of 450° C. or higher. The alloying treatment is preferably performed at a temperature of 600° C. or lower. By performing the alloying treatment at a temperature of 450° C. or higher, it is possible to provide the steel sheet with excellent press formability without residual n-phase. In addition, by performing the alloying treatment at a temperature of 600° C. or lower, it is possible to provide the steel sheet with good coating or plating adhesion. The alloying time is preferably 5 seconds or more. The alloying time is preferably 60 seconds or less.

The following describes how to calculate the coating weight per surface of the alloyed galvanized layer.

First, two samples of 20 mm×25 mm in size are taken from an alloyed galvanized steel sheet. After the weight of each sample is measured, the alloyed galvanized layer on one side of each sample on which an Fe-based electroplating layer is formed is exfoliated with a test solution as specified in JIS H 0401 (2013) or ISO 17925 (2004), and the weight is measured again. The coating weight per surface of the alloyed galvanized layer can be calculated by subtracting the weight after the exfoliation of plating from the weight before the exfoliation of plating, and dividing the result by the surface area over which the plating has been exfoliated. In this case, the average value of two locations is taken as the coating weight per surface of the alloyed galvanized layer.

The measurement of the Fe content (mass %) in the alloyed galvanized layer is performed in accordance with ISO 17925 (2004). The test solution after the exfoliation of plating is analyzed using an inductively coupled plasma (ICP) luminescence analyzer to determine the content of each component in the test solution. Then, the Fe content in the test solution is divided by the total content of those components in the test solution that constitute the alloyed galvanized layer, such as Fe, Zn, and Al, and the result is multiplied by 100 to determine the Fe content in the alloyed galvanized layer. In this case, the average value of two locations is taken as the Fe content in the alloyed galvanized layer.

<Electrodeposition-Coated Steel Sheet>

According to this embodiment, it is also possible to provide an electrodeposition-coated steel sheet comprising: a chemical conversion layer formed on the alloyed galvanized layer of the aforementioned alloyed galvanized steel sheet; and an electrodeposition coating layer formed on the chemical conversion layer. The alloyed galvanized steel sheet in this embodiment has excellent resistance to cracking in resistance welding at a welded portion. Therefore, an electrodeposition-coated steel sheet formed using the alloyed galvanized steel sheet disclosed herein is particularly suitable for application to automotive parts. The types of the chemical conversion layer and the electrodeposition coating layer are not limited, and publicly known chemical conversion layers and electrodeposition coating layers may be used. The chemical conversion layer may be, for example, a zinc phosphate layer or a zirconium layer. The electrodeposition coating layer is not limited as long as it is an electrodeposition coating layer for automotive use. The thickness of the electrodeposition coating layer varies depending on the application. However, it is preferably about 10 μm or more in the dry state. It is preferably about 30 μm or less in the dry state. According to this embodiment, it is also possible to provide an alloyed galvanized steel sheet for electrodeposition coating to apply electrodeposition coating.

<Method of Producing Electrodeposition-Coated Steel Sheet>

Next, a method of producing the aforementioned electrodeposition-coated steel sheet will be described. The aforementioned electrodeposition-coated steel sheet may be produced with a method of producing an electrodeposition-coated steel sheet, the method comprising: subjecting an alloyed galvanized steel sheet to chemical conversion treatment to obtain a chemical-conversion-treated steel sheet with a chemical conversion layer formed on the alloyed galvanized layer; and subjecting the chemical-conversion-treated steel sheet to electrodeposition coating treatment to obtain an electrodeposition-coated steel sheet with an electrodeposition coating layer formed on the chemical conversion layer. Regarding the chemical conversion treatment and electrodeposition coating treatment, conventional methods may be followed. Prior to the chemical conversion treatment, degreasing, water washing, and if necessary, surface conditioning treatment may be performed to clean the surface of the alloyed galvanized steel sheet. These pretreatments are followed by the chemical conversion treatment. The methods of degreasing and water washing are not limited, and conventional methods may be followed. In the surface conditioning treatment, surface conditioners containing Ti colloids or zinc phosphate colloids can be used, for example. Regarding the application of these surface conditioners, no special process is required and conventional methods may be followed. For example, the desired surface conditioner is dissolved in a certain deionized water and stirred thoroughly to obtain a treatment solution at a predetermined temperature (usually room temperature, i.e., 25° C. to 30° C.). Then, the steel sheet is immersed in the obtained treatment solution for a predetermined time (e.g., 20 seconds to 30 seconds). The steel sheet is then subjected to the subsequent chemical conversion treatment without being dried. Regarding the chemical conversion treatment, conventional methods may be followed. For example, the desired chemical conversion treatment agent is dissolved in a certain deionized water and stirred thoroughly to obtain a treatment solution at a predetermined temperature (usually 35° C. to 45° C.). Then, the steel sheet is immersed in the obtained treatment solution for a predetermined time (e.g., 60 seconds to 120 seconds). As the chemical conversion treatment agent, for example, a zinc phosphate treatment agent for steel, a zinc phosphate treatment agent for combined use of steel and aluminum, or a zirconium treatment agent may be used. The steel sheet is then subjected to the subsequent electrodeposition coating. Regarding the electrodeposition coating, conventional methods may be followed. After pretreatment such as water washing, if necessary, the steel sheet is immersed in an electrodeposition coating material that has been thoroughly stirred to obtain the desired thickness of electrodeposition coating by electrodeposition treatment. As the electrodeposition coating, anionic electrodeposition coating as well as cationic electrodeposition coating can be used. Furthermore, for example, top coating may be applied after the electrodeposition coating, depending on the application.

<Automotive Part>

According to this embodiment, it is also possible to provide an automotive part that is at least partially made from the electrodeposition-coated steel sheet described above. The alloyed galvanized steel sheet in this embodiment has excellent resistance to cracking in resistance welding at a welded portion. Therefore, an electrodeposition-coated steel sheet formed using the alloyed galvanized steel sheet disclosed herein is particularly suitable for application to automotive parts. The automotive part made from the electrodeposition-coated steel sheet may contain a steel sheet other than the electrodeposition-coated steel sheet in this embodiment as the raw material. Since the electrodeposition-coated steel sheet in this embodiment has excellent resistance to cracking in resistance welding at a welded portion, LME cracking is suitably prevented from occurring at a welded portion of an automotive part formed using the alloyed galvanized steel sheet. The types of the automotive part at least partially made from the electrodeposition-coated steel sheet are not limited. However, the automotive part may be, for example, a side sill part, a pillar part, or an automotive body.

Embodiment 2

Next, an alloyed galvanized steel sheet according to Embodiment 2 of the present disclosure will be described.

The alloyed galvanized steel sheet in this embodiment may be an alloyed galvanized steel sheet comprising:
a cold-rolled steel sheet;
an Fe-based electroplating layer formed on at least one surface of the cold-rolled steel sheet with a coating weight per surface of more than 20.0 g/m$^2$; and
an alloyed galvanized layer formed on the Fe-based electroplating layer, wherein
crystal orientations of the Fe-based electroplating layer and the cold-rolled steel sheet are integrated at a ratio of more than 50% at an interface between the Fe-based electroplating layer and the cold-rolled steel sheet.

As used herein, the cold-rolled steel sheet is a cold-rolled steel sheet where a test specimen of the cold-rolled steel sheet that is cut to a size of 50 mm×150 mm with a direction orthogonal to the rolling direction as a lengthwise direction is overlapped with a test galvannealed steel sheet that is cut to the same size having a hot-dip galvanized layer with a coating weight per surface of 50 g/m$^2$ to obtain a sheet combination, next, using a single-phase AC (50 Hz) resistance welding machine of servomotor pressure type, the sheet combination is inclined 5° to the lengthwise direction side of the sheet combination with respect to a plane perpendicular to a line connecting the central axes of an electrode pair (tip diameter 6 mm) of the resistance welding machine, the lower electrode of the electrode pair and the sheet combination are fixed so that a gap of 60 mm in the lengthwise direction of the sheet combination and 2.0 mm in the thickness direction of the sheet combination is provided between the lower electrode and the test specimen, the upper electrode of the electrode pair is movable, and resistance welding is applied to the sheet combination under the following conditions: applied pressure: 3.5 kN, hold time: 0.16 seconds, and welding current and welding time to produce a nugget diameter of 5.9 mm, to obtain a sheet combination with a welded portion, and the sheet combination with a welded portion is then cut in half along the lengthwise direction of the test specimen to include a welded portion, a cross section of the welded portion is observed under an optical microscopy (magnification 200×), and a crack as long as 0.1 mm or more is observed.

The cold-rolled steel sheet in this embodiment is not particularly limited if it is a steel sheet inferior in resistance to cracking in resistance welding at a welded portion when combined with a galvanized steel sheet and evaluated by the following test. The chemical composition of the cold-rolled steel sheet is not particularly limited. However, we have found that a cold-rolled steel sheet containing Si in an amount of 0.1 mass % or more in the steel is inferior in resistance to cracking in resistance welding at a welded portion when evaluated by the following test.

The cold-rolled steel sheet may be a cold-rolled steel sheet where the sheet combination with a welded portion is obtained by performing the resistance welding at a hold time of 0.24 seconds, a cross section of the welded portion is observed under an optical microscopy (magnification 200×), and a crack as long as 0.1 mm or more is observed. In the case of the same cold-rolled steel sheet, the resistance to cracking in resistance welding at a welded portion generally deteriorates as the hold time decreases. Therefore, if cracks as long as 0.1 mm or more are observed in a cold-rolled steel sheet when the sheet combination is obtained by performing the resistance welding at a hold time of 0.24 seconds and the cross section of the welded portion is observed under an optical microscopy (magnification 200×), cracks as long as 0.1 mm or more can be observed when the cross section of a welded portion is observed under an optical microscopy (magnification 200×) even when the resistance welding is performed at a hold time of 0.16 seconds. If the cold-rolled steel sheet contains Si in an amount of 0.50 mass % or more in the steel, it is inferior in resistance to cracking in resistance welding at a welded portion when evaluated by the aforementioned test. However, it has also been confirmed that even a cold-rolled steel sheet containing Si in an amount of less than 0.50 mass % in the steel may be inferior in resistance to cracking in resistance welding at a welded portion when evaluated by the following test.

<Resistance to Cracking in Resistance Welding at Welded Portion>

Figure 8A:
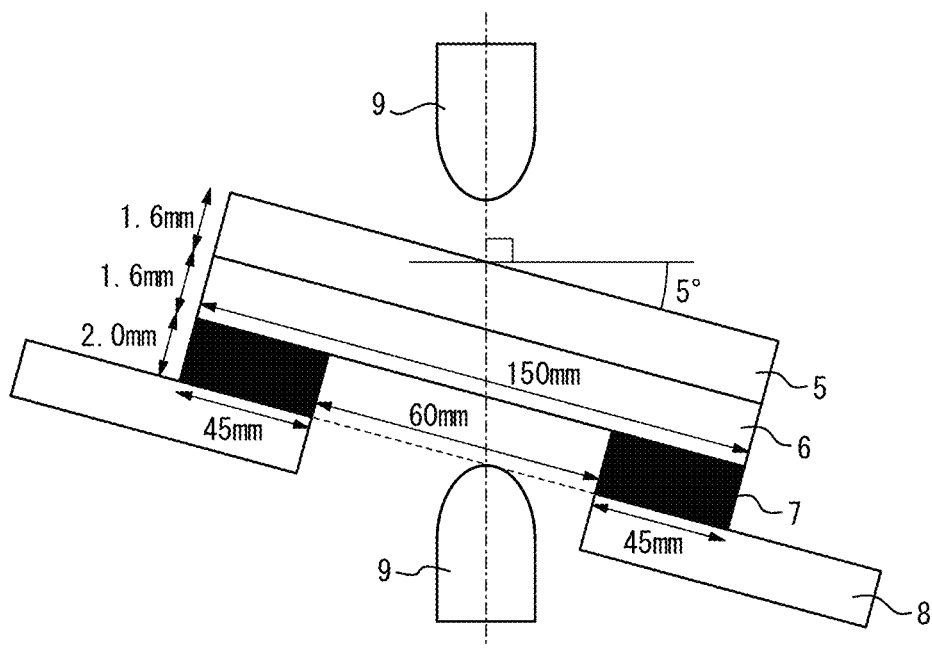
FIG. 8A illustrates evaluation of resistance to cracking in resistance welding at a welded portion.

The evaluation method of the resistance to cracking in resistance welding at a welded portion will be described below with reference to FIGS. 8A and 8B. As a sheet combination, a test specimen 6 that is cut to a size of 50 mm×150 mm with the transverse direction ("TD", direction orthogonal to the rolling direction) as the lengthwise direction and the rolling direction as the widthwise direction is overlapped with a test galvannealed steel sheet 5 that is cut to the same size having a hot-dip galvanized layer with a coating weight per surface of 50 g/m². The sheet combination is assembled so that the surface to be evaluated (i.e., the surface on the Fe-based electroplating layer side) of the test specimen 6 and the galvanized layer of the test galvannealed steel sheet 5 face each other. The sheet combination is fixed to a fixing stand 8 via spacers 7 of 2.0 mm thick. The spacers 7 are a pair of steel sheets, each measuring 50 mm long (lengthwise direction)×45 mm wide (widthwise direction)× 2.0 mm thick (thickness direction). As illustrated in FIG. 8A, the lengthwise end faces of the pair of steel sheets are aligned with the widthwise end faces of the sheet combination. Thus, the distance between the pair of steel sheets is 60 mm. The fixing stand 8 is a single plate with a hole in the center.

Then, using a single-phase AC (50 Hz) resistance welding machine of servomotor pressure type, the sheet combination is subjected to resistance welding at a welding current and a welding time that result in a nugget diameter r of 5.9 mm while being deflected by applying pressure with a pair of electrodes 9 (tip diameter: 6 mm) under the conditions of an applied pressure of 3.5 kN and a hold time of 0.18 seconds or 0.24 seconds, to form a sheet combination with a welded portion. The pair of electrodes 9 pressurize the sheet combination from above and below in the vertical direction, with the lower electrode pressurizing the test specimen 6 through the hole in the fixing stand 8. In applying pressure, the lower electrode of the pair of electrodes 9 and the fixing stand 8 are fixed, and the upper electrode is movable so that the lower electrode is in contact with a plane that is an extension of a plane where the spacer 7 touches the fixing stand 8. The upper electrode is in contact with the center of the test galvannealed steel sheet 5. The sheet combination is welded with the sheet combination inclined 5° to the lengthwise direction side of the sheet combination with respect to a plane perpendicular to a line connecting the central axes of the electrode pair of the resistance welding machine (horizontal direction in FIG. 8A). A gap of 60 mm in the lengthwise direction of the sheet combination and 2.0 mm in the thickness direction of the sheet combination is formed between the lower electrode and the test specimen 6 by the spacers. The hold time refers to the time between the end of welding current and the beginning of release of the electrodes. As illustrated in the lower part of FIG. 8B, the nugget diameter r means the distance between the ends of a nugget 10 in the lengthwise direction of the sheet combination.

Figure 8B:
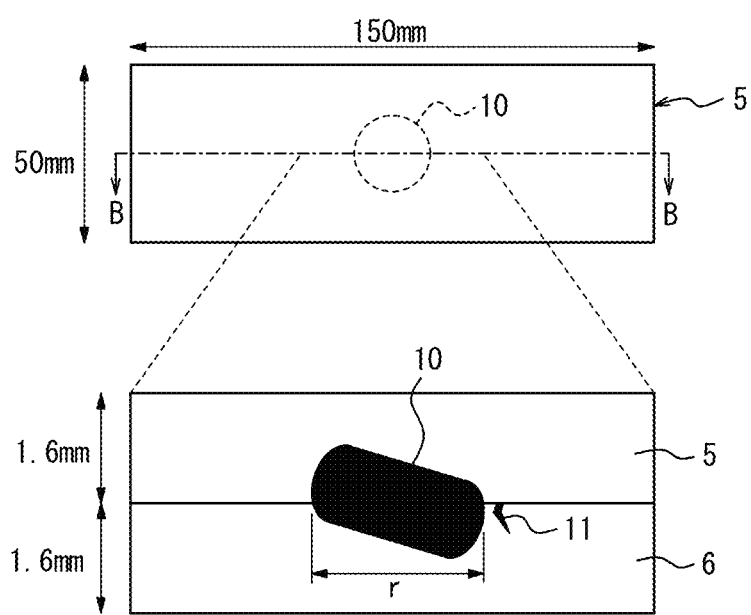
FIG. 8B illustrates a top view of a sheet combination after welding in the evaluation in the upper part, and a B-B cross section in the lower part.

Then, the sheet combination with a welded portion is cut along the B-B line indicated in the upper part of FIG. 8B to include the center of the welded portion including the nugget 10, and the cross-section of the welded portion is observed under an optical microscopy (200×) to evaluate the resistance to cracking in resistance welding at the welded portion using the following criteria. If the result is ⊚ or ○, the sheet combination is judged to have satisfactory resistance to cracking in resistance welding at the welded portion. If the result is x, the sheet combination is judged to have poor resistance to cracking in resistance welding at the welded portion.

⊚: No cracks as long as 0.1 mm or more are observed at a hold time of 0.14 seconds.
○: Cracks as long as 0.1 mm or more are observed at a hold time of 0.14 seconds, but no cracks as long as 0.1 mm or more are observed at a hold time of 0.16 seconds.
x: Cracks as long as 0.1 mm or more are observed at a hold time of 0.16 seconds.

Further, the resistance to cracking in resistance welding at the welded portion may be evaluated using the following criteria under milder welding conditions.

⊚: No cracks as long as 0.1 mm or more are observed at a hold time of 0.18 seconds.
○: Cracks as long as 0.1 mm or more are observed at a hold time of 0.18 seconds, but no cracks as long as 0.1 mm or more are observed at a hold time of 0.24 seconds.
x: Cracks as long as 0.1 mm or more are observed at a hold time of 0.24 seconds.

An example of a crack in the test specimen 6 is schematically illustrated in the lower part of FIG. 12B, as indicated by reference numeral 11.

The Fe-based electroplating layer and the alloyed galvanized layer of the alloyed galvanized steel sheet in this embodiment are the same as in the Embodiment 1 described above, and the description thereof is omitted. The crystal orientations of the Fe-based electroplating layer and the cold-rolled steel sheet are integrated at a ratio of more than 50% at the interface between the Fe-based electroplating layer and the cold-rolled steel sheet, as in the Embodiment 1 described above. The details of the ratio at which the crystal orientations of the Fe-based electroplating layer and the cold-rolled steel sheet are integrated at the interface between the Fe-based electroplating layer and the cold-rolled steel sheet are the same as in the Embodiment 1 described above, and the description thereof is omitted.

Next, a method of producing an alloyed galvanized steel sheet according to Embodiment 2 will be described.

A method of producing an alloyed galvanized steel sheet according to one embodiment may be a method of producing an alloyed galvanized steel sheet comprising:

subjecting a cold-rolled steel sheet to Fe-based electroplating to obtain a pre-annealing Fe-based electroplated steel sheet with a pre-annealing Fe-based electroplating layer formed on at least one surface thereof;
then subjecting the pre-annealing Fe-based electroplated steel sheet to annealing in an atmosphere with a dew point of −30° C. or lower to obtain an Fe-based electroplated steel sheet;
then subjecting the Fe-based electroplated steel sheet to galvanization to obtain a galvanized steel sheet; and
then further subjecting the galvanized steel sheet to alloying treatment to obtain an alloyed galvanized steel sheet comprising an Fe-based electroplating layer having a coating weight per surface of more than 20.0 g/m².

As used herein, the cold-rolled steel sheet is a cold-rolled steel sheet where a test specimen of the cold-rolled steel sheet that is cut to a size of 50 mm×150 mm with a direction orthogonal to the rolling direction as a lengthwise direction is overlapped with a test galvannealed steel sheet that is cut to the same size having a hot-dip galvanized layer with a coating weight per surface of 50 g/m² to obtain a sheet combination, next, using a single-phase AC (50 Hz) resistance welding machine of servomotor pressure type, the sheet combination is inclined 5° to the lengthwise direction side of the sheet combination with respect to a plane perpendicular to a line connecting the central axes of an electrode pair (tip diameter 6 mm) of the resistance welding machine, the lower electrode of the electrode pair and the sheet combination are fixed so that a gap of 60 mm in the lengthwise direction of the sheet combination and 2.0 mm in the thickness direction of the sheet combination is provided between the lower electrode and the test specimen, the upper electrode of the electrode pair is movable, and resistance welding is applied to the sheet combination under the following conditions: applied pressure: 3.5 kN, hold time: 0.16 seconds, and welding current and welding time to produce a nugget diameter of 5.9 mm, to obtain a sheet combination with a welded portion, and the sheet combination with a welded portion is then cut in half along the lengthwise direction of the test specimen to include a welded portion, a cross section of the welded portion is observed under an optical microscopy (magnification 200×), and a crack as long as 0.1 mm or more is observed.

First, a cold-rolled steel sheet is produced. Regarding the method of producing a cold-rolled steel sheet, conventional methods may be followed. In one example, a cold-rolled steel sheet is produced by hot rolling a steel slab to obtain a hot-rolled sheet, then subjecting the hot-rolled sheet to acid cleaning, and then cold rolling the hot-rolled sheet to obtain a cold-rolled steel sheet.

The cold-rolled steel sheet according to this embodiment is not particularly limited if it is a steel sheet inferior in resistance to cracking in resistance welding at a welded portion when combined with a galvanized steel sheet and evaluated by the test described above. The chemical composition of the cold-rolled steel sheet is not particularly limited, either. We have found that, if it is a cold-rolled steel sheet containing Si in an amount of 0.1 mass % or more in the steel, it is inferior in resistance to cracking in resistance welding at a welded portion when evaluated by the following test.

The cold-rolled steel sheet may be a cold-rolled steel sheet where the sheet combination with a welded portion is obtained by performing the resistance welding at a hold time of 0.24 seconds, a cross section of a welded portion is observed under an optical microscopy (magnification 200×), and a crack as long as 0.1 mm or more is observed. In the case of the same cold-rolled steel sheet, the resistance to cracking in resistance welding at a welded portion generally deteriorates as the hold time decreases. Therefore, if cracks as long as 0.1 mm or more are observed in a cold-rolled steel sheet where the sheet combination with a welded portion is obtained by performing resistance welding at a hold time of 0.24 seconds and a cross section of a welded portion is observed under an optical microscopy (magnification 200×), cracks as long as 0.1 mm or more can be observed when the cross section of a welded portion is observed under an optical microscopy (magnification 200×) even when the resistance welding is performed at a hold time of 0.16 seconds. If the cold-rolled steel sheet contains Si in an amount of 0.50 mass % or more in the steel, it is inferior in resistance to cracking in resistance welding at a welded portion when evaluated by the test described above. However, it has also been confirmed that even a cold-rolled steel sheet containing Si in an amount of less than 0.50 mass % in the steel may be inferior in resistance to cracking in resistance welding at a welded portion when evaluated by the test described above.

Next, the surface of the cold-rolled steel sheet is subjected to Fe-based electroplating to obtain a pre-annealing Fe-based electroplated steel sheet. The details of the Fe-based electroplating treatment have been described above, and the description thereof is omitted.

Then, the pre-annealing Fe-based electroplated steel sheet is subjected to an annealing process in which the steel sheet is held in a temperature range of 650° C. to 900° C. for 30 seconds to 600 seconds in a reducing atmosphere with a dew point of −30° C. or lower and a hydrogen concentration from 1.0 vol. % to 30.0 vol. %, and then cooled to obtain an Fe-based electroplated steel sheet. The details of the annealing process have been described above, and the description thereof is omitted.

As in the Embodiment 1 described above, galvanization is performed on the Fe-based electroplated steel sheet in this embodiment to obtain a galvanized steel sheet. The details of the galvanization treatment are the same as in the Embodiment 1 described above, and the description thereof is omitted.

According to this embodiment, it is also possible to provide an electrodeposition-coated steel sheet comprising: a chemical conversion layer formed on the alloyed galvanized layer of the alloyed galvanized steel sheet in this embodiment; and an electrodeposition coating layer formed on the chemical conversion layer, as in the Embodiment 1 described above. Further, it is possible to provide an alloyed galvanized steel sheet for electrodeposition coating to apply electrodeposition coating. The details of the electrodeposition-coated steel sheet and a method of producing the electrodeposition-coated steel sheet are the same as in the Embodiment 1 described above, and the description thereof is omitted.

Further, this embodiment also can provide an automotive part, as in the Embodiment 1 described above. The details of the automotive part have been described above, and the description thereof is omitted.

The present disclosure will be specifically described based on the examples below.

EXAMPLES

Example 1

Cast steel samples were prepared by smelting steel with the chemical compositions listed in Table 1, and they were subjected to hot rolling, acid cleaning, and cold rolling to obtain cold-rolled steel sheets with a thickness of 1.6 mm.

TABLE 1

| Steel sample ID | C | Si | Mn | P | S | N | Al | B | Ti | Nb | Mo | Cu | Ni | |
|---|---|---|---|---|---|---|---|---|---|---|---|---|---|---|
| A | 0.18 | 0.41 | 1.55 | 0.02 | 0.002 | 0.004 | 0.039 | 0.001 | 0.01 | — | — | — | — | Conforming steel |
| B | 0.15 | 0.91 | 2.16 | 0.02 | 0.002 | 0.004 | 0.036 | — | — | — | — | — | — | Conforming steel |
| C | 0.18 | 1.02 | 3.08 | 0.02 | 0.002 | 0.006 | 0.038 | 0.001 | 0.01 | 0.018 | — | — | — | Conforming steel |
| D | 0.12 | 1.20 | 1.85 | 0.01 | 0.001 | 0.004 | 0.032 | 0.001 | 0.01 | — | — | — | — | Conforming steel |
| E | 0.24 | 1.41 | 1.33 | 0.01 | 0.001 | 0.003 | 0.034 | 0.001 | 0.01 | — | — | — | — | Conforming steel |
| F | 0.13 | 1.39 | 1.94 | 0.01 | 0.001 | 0.007 | 0.033 | 0.001 | 0.01 | — | — | — | — | Conforming steel |
| G | 0.08 | 1.49 | 1.52 | 0.01 | 0.001 | 0.003 | 0.035 | 0.001 | 0.01 | — | — | — | — | Conforming steel |
| H | 0.17 | 1.53 | 2.31 | 0.01 | 0.001 | 0.004 | 0.037 | — | — | — | 0.11 | — | — | Conforming steel |
| I | 0.19 | 1.51 | 2.72 | 0.01 | 0.001 | 0.004 | 0.034 | 0.001 | 0.01 | — | — | 0.12 | — | Conforming steel |
| J | 0.15 | 1.65 | 1.33 | 0.02 | 0.002 | 0.005 | 0.036 | 0.001 | 0.01 | — | — | — | 0.14 | Conforming steel |
| K | 0.17 | 1.68 | 2.51 | 0.03 | 0.002 | 0.004 | 0.036 | 0.001 | 0.01 | — | — | — | — | Conforming steel |

"—" indicates a content at inevitable impurity level.

TABLE 3

| Steel sample ID | C | Si | Mn | P | S | N | Al | B | Ti | Cr | Nb | Mo | Cu | Ni | |
|---|---|---|---|---|---|---|---|---|---|---|---|---|---|---|---|
| L | 0.11 | 0.52 | 2.56 | 0.01 | 0.001 | 0.003 | 0.033 | 0.001 | 0.01 | 0.59 | — | — | — | — | Conforming steel |
| M | 0.09 | 0.61 | 2.69 | 0.03 | 0.002 | 0.005 | 0.037 | 0.001 | 0.01 | — | — | — | — | — | Conforming steel |

"—" indicates a content at inevitable impurity level.

Then, each cold-rolled steel sheet was subjected to degreasing with alkali, followed by electrolytic treatment with the steel sheet as the cathode under the conditions described below to produce a pre-annealing Fe-based electroplated steel sheet having a pre-annealing Fe-based electroplating layer on one surface. The coating weight of the pre-annealing Fe-based electroplating layer was calculated with the cross-sectional observation method described above and controlled by current passage time. Subsequently, the pre-annealing Fe-based electroplated steel sheets were subjected to reduction annealing at 15% $H_2$—$N_2$ and a soaking zone temperature of 800° C., with the dew point of the atmosphere adjusted as listed in Tables 2-1, 2-2, and 4, to obtain Fe-based electroplated steel sheets. The obtained Fe-based electroplated steel sheets were cooled to 440° C. to 550° C., and then subjected to hot-dip galvanizing treatment using a hot-dip galvanizing bath at 460° C., where the effective Al concentration in the bath was 0.132 mass % with the balance being Zn and inevitable impurities. Subsequently, the coating amount was adjusted to approximately 50 g/m² per surface by gas wiping to produce galvanized steel sheets. Subsequently, the galvanized steel sheets were subjected to alloying treatment at 490° C. for varying times to produce alloyed galvanized steel sheet samples with different Fe contents diffused in the alloyed galvanized layers.

[Electrolytic Conditions]
  Bath temperature: 50° C.
  pH: 2.0
  Current density: 45 A/dm²
  Fe-based electroplating bath: containing 1.5 mol/L of $Fe^{2+}$ ions
  Electrode (anode): iridium oxide electrode From each alloyed galvanized steel sheet thus prepared, the coating weight per surface of the Fe-based electroplating layer, the coating weight of the alloyed galvanized layer, the Fe content (mass %) in the alloyed galvanized layer, and the ratio at which the crystal orientations of the Fe-based electroplating layer and the Si-containing cold-rolled steel sheet are integrated at the interface between the Fe-based electroplating layer and the Si-containing cold-rolled steel sheet were determined according to the methods described above.

The resistance to cracking in resistance welding at a welded portion was also investigated for each alloyed galvanized steel sheet thus prepared. The following describes the measurement and evaluation methods of the resistance to cracking in resistance welding at a welded portion.

<Resistance to Cracking in Resistance Welding at Welded Portion>

For each alloyed galvanized steel sheet, the resistance to cracking in resistance welding at a welded portion was evaluated with the method described above when combined with a test galvannealed steel sheet (1.6 mm thick) having a tensile strength of 980 MPa and a coating weight per surface of 50 g/m², with a Si content of less than 0.5%, where the resistance to cracking in resistance welding was not an issue at a hold time of 0.18 seconds. The welding time was 0.36 seconds and the hold times were 0.18 seconds and 0.24 seconds. The nugget diameter was measured by changing the welding current for each Example No., and the evaluation was performed at the welding current where the nugget diameter was 5.9 mm. When no cracks were found in the combined test galvannealed steel sheet, it was taken as example data. This is because if a crack occurs in the combined sheet, the stress on the alloyed galvanized steel sheet to be evaluated is dispersed, making it impossible to perform appropriate evaluation.

The results of the above tests are listed in Tables 2-1, 2-2, and 4. The results demonstrate that the alloyed galvanized steel sheets in our examples, in which Fe-based electroplating layers were formed under the conditions conforming to the present disclosure before the annealing process, exhibited excellent resistance to cracking in resistance welding at a welded portion. In Reference Examples 1 and 2, no particular problems were observed in the resistance to cracking in resistance welding at a welded portion since the Si content was less than 0.5%. In each of our examples where a pre-annealing Fe-based electroplating layer was formed prior to the formation of a galvanized layer, alloying treatment was applied after galvanization to obtain a galvannealed steel sheet, and the coating weight of the Fe-based electroplating layer in the steel sheet was 25.0 g/m² or more, cracks as long as 0.1 mm or more were not observed even at a hold time of 0.18 seconds, and the resistance to cracking in resistance welding at a welded portion was particularly good. In Tables 2-1 and 2-2, the coating weight of the Fe-based electroplating layer and the alloyed galvanized layer is indicated as "-" for the examples where no Fe-based electroplating layer was formed. In Reference Examples No. 17, 29, and 45 where annealing processes were performed at a high dew point of higher than −30° C., the ratio at which the crystal orientations of the Fe-based electroplating layer and the Si-containing cold-rolled steel sheet were integrated at the interface between the Fe-based electroplating layer and the Si-containing cold-rolled steel sheet was low because of the annealing at a high dew point, and the resistance to cracking in resistance welding at a welded portion was good. In these reference examples, the pre-annealing Fe-based electroplated steel sheets were heated to a soaking zone temperature of 800° C. at an average heating rate of at least 10° C./s in the temperature range of 400° C. to 650° C., and then subjected to reduction annealing.

TABLE 2-1

| No. | Steel sample ID | Pre-annealing Type of coating or plating | Pre-annealing Fe-based electroplating layer Coating weight g/m² | Annealing Dew point ° C. | Alloyed galvanized layer Coating weight g/m² | Alloyed galvanized layer Fe % mass % | Fe-based electroplating layer Coating weight g/m² | Fe-based electroplating layer Ratio of integrated crystal orientations % | Resistance to cracking in resistance welding | Tensile strength TS MPa | Remarks |
|---|---|---|---|---|---|---|---|---|---|---|---|
| 1 | A | GA | — | −43 | 48.2 | 10.6 | — | — | ◎ | 601 | Reference Example |
| 2 | A | GA | 15.5 | −37 | 52.5 | 11.1 | 9.8 | 85 | ◎ | 598 | Reference Example |
| 3 | B | GA | — | −31 | 52.1 | 12.0 | — | — | X | 933 | Comparative Example |
| 4 | B | GA | 16.5 | −32 | 60.3 | 10.5 | 10.5 | 88 | X | 940 | Comparative Example |
| 5 | B | GA | 27.1 | −36 | 58.7 | 11.6 | 20.5 | 82 | ○ | 945 | Example |
| 6 | B | GA | 40.1 | −38 | 55.0 | 9.5 | 35.5 | 84 | ◎ | 938 | Example |
| 7 | C | GA | — | −41 | 41.3 | 8.6 | — | — | X | 1178 | Comparative Example |
| 8 | C | GA | 11.5 | −35 | 35.1 | 10.2 | 8.0 | 98 | X | 1183 | Comparative Example |
| 9 | C | GA | 27.6 | −43 | 40.1 | 11.6 | 23.1 | 94 | ○ | 1174 | Example |
| 10 | C | GA | 43.1 | −38 | 37.6 | 9.5 | 40.2 | 86 | ◎ | 1169 | Example |
| 11 | D | GA | — | −44 | 53.4 | 11.3 | — | — | X | 858 | Comparative Example |
| 12 | D | GA | 17.5 | −48 | 56.8 | 10.8 | 11.6 | 90 | X | 851 | Comparative Example |
| 13 | D | GA | 29.5 | −50 | 51.3 | 10.9 | 24.2 | 88 | ○ | 855 | Example |
| 14 | D | GA | 39.0 | −53 | 52.6 | 11.6 | 33.4 | 96 | ◎ | 849 | Example |
| 15 | E | GA | — | −33 | 73.1 | 10.8 | — | — | X | 836 | Comparative Example |
| 16 | E | GA | 27.8 | −36 | 72.5 | 12.1 | 19.0 | 89 | X | 830 | Comparative Example |
| 17 | E | GA | 27.4 | 12 | 74.0 | 11.6 | 19.0 | 13 | ◎ | 840 | Reference Example |
| 18 | E | GA | 39.9 | −31 | 73.6 | 11.5 | 31.6 | 91 | ◎ | 834 | Example |
| 19 | F | GA | — | −37 | 46.5 | 10.4 | — | — | X | 944 | Comparative Example |
| 20 | F | GA | 19.6 | −34 | 50.2 | 8.0 | 15.7 | 90 | X | 951 | Comparative Example |
| 21 | F | GA | 26.3 | −33 | 38.1 | 12.6 | 21.7 | 95 | ○ | 960 | Example |
| 22 | F | GA | 47.2 | −38 | 62.8 | 10.6 | 41.0 | 84 | ◎ | 947 | Example |

Underlined if outside the appropriate range of the present disclosure.

TABLE 2-2

| No. | Steel sample ID | Pre-annealing Type of coating or plating | Pre-annealing Fe-based electroplating layer Coating weight g/m² | Annealing Dew point ° C. | Alloyed galvanized layer Coating weight g/m² | Alloyed galvanized layer Fe % mass % | Fe-based electroplating layer Coating weight g/m² | Fe-based electroplating layer Ratio of integrated crystal orientations % | Resistance to cracking in resistance welding | Tensile strength TS MPa | Remarks |
|---|---|---|---|---|---|---|---|---|---|---|---|
| 23 | G | GA | — | −46 | 52.6 | 10.8 | — | — | X | 849 | Comparative Example |
| 24 | G | GA | 21.3 | −40 | 50.5 | 10.4 | 16.1 | 86 | X | 850 | Comparative Example |
| 25 | G | GA | 35.1 | −41 | 51.3 | 7.1 | 31.8 | 95 | ○ | 846 | Example |
| 26 | G | GA | 46.0 | −45 | 52.2 | 11.3 | 40.3 | 87 | ◎ | 847 | Example |
| 27 | G | GA | 62.2 | −44 | 50.8 | 13.6 | 55.7 | 94 | ◎ | 850 | Example |
| 28 | H | GA | — | −33 | 53.6 | 7.9 | — | — | X | 999 | Comparative Example |
| 29 | H | GA | 15.9 | 12 | 68.0 | 15.0 | 5.7 | 9 | ◎ | 1003 | Reference Example |
| 30 | H | GA | 15.4 | −37 | 51.1 | 12.0 | 9.4 | 97 | X | 1001 | Comparative Example |
| 31 | H | GA | 38.6 | −35 | 69.6 | 11.9 | 30.5 | 100 | ◎ | 1003 | Example |
| 32 | H | GA | 39.4 | −38 | 44.3 | 10.5 | 35.2 | 93 | ◎ | 994 | Example |
| 33 | H | GA | 43.2 | −41 | 52.1 | 8.3 | 39.4 | 97 | ◎ | 990 | Example |
| 34 | H | GA | 56.4 | −47 | 53.6 | 11.2 | 50.9 | 94 | ◎ | 997 | Example |
| 35 | I | GA | — | −40 | 57.3 | 10.6 | — | — | X | 1030 | Comparative Example |
| 36 | I | GA | 24.6 | −39 | 53.1 | 10.4 | 19.3 | 90 | X | 1038 | Comparative Example |
| 37 | I | GA | 30.6 | −41 | 56.8 | 12.1 | 23.9 | 88 | ○ | 1042 | Example |
| 38 | I | GA | 45.6 | −35 | 51.6 | 11.6 | 40.2 | 89 | ◎ | 1040 | Example |

TABLE 2-2-continued

| | | Pre-annealing | | | Alloyed galvanized layer | | Fe-based electroplating layer | | | |  |  |
|---|---|---|---|---|---|---|---|---|---|---|---|---|
| | | Fe-based electroplating layer | Annealing | | | | | Ratio of integrated | Resistance to | Tensile | | |
| No. | Steel sample ID | Type of coating or plating | Coating weight g/m² | Dew point ° C. | Coating weight g/m² | Fe % mass % | Coating weight g/m² | crystal orientations % | cracking in resistance welding | strength TS MPa | Remarks |
| 39 | J | GA | — | −38 | 28.6 | 9.5 | — | — | X | 836 | Comparative Example |
| 40 | J | GA | 15.5 | −31 | 26.3 | 9.0 | 13.2 | 99 | X | 829 | Comparative Example |
| 41 | J | GA | 27.1 | −33 | 27.1 | 9.2 | 24.7 | 90 | ○ | 834 | Example |
| 42 | J | GA | 33.6 | −36 | 31.6 | 10.1 | 30.6 | 96 | ◎ | 830 | Example |
| 43 | J | GA | 53.8 | −48 | 35.2 | 9.8 | 51.1 | 86 | ◎ | 826 | Example |
| 44 | K | GA | — | −42 | 70.6 | 8.1 | — | — | X | 1028 | Comparative Example |
| 45 | K | GA | 21.1 | −25 | 74.1 | 7.6 | 15.7 | 5 | ○ | 1046 | Reference Example |
| 46 | K | GA | 23.3 | −38 | 73.6 | 7.4 | 18.0 | 84 | X | 1022 | Comparative Example |
| 47 | K | GA | 35.2 | −40 | 76.2 | 14.1 | 24.7 | 70 | ○ | 1019 | Example |
| 48 | K | GA | 51.0 | −35 | 74.2 | 7.1 | 45.9 | 92 | ◎ | 1021 | Example |
| 49 | K | GA | 62.3 | −33 | 71.1 | 11.2 | 54.5 | 85 | ◎ | 1025 | Example |

Underlined if outside the appropriate range of the present disclosure.

TABLE 4

| | | Pre-annealing | | | Alloyed galvanized layer | | Fe-based electroplating layer | | | | |
|---|---|---|---|---|---|---|---|---|---|---|---|
| | | Fe-based electroplating layer | Annealing | | | | | Ratio of integrated | Resistance to | Tensile | |
| No. | Steel sample ID | Type of coating or plating | Coating weight g/m² | Dew point ° C. | Coating weight g/m² | Fe % mass % | Coating weight g/m³ | crystal orientations % | cracking in resistance welding | strength TS MPa | Remarks |
| 1 | L | GA | 25.6 | −38 | 49.6 | 9.7 | 20.8 | 91 | ○ | 1083 | Example |
| 2 | L | GA | 38.1 | −32 | 50.2 | 11.6 | 32.3 | 85 | ◎ | 1078 | Example |
| 3 | M | GA | 28.0 | −32 | 59.0 | 11.4 | 21.3 | 87 | ○ | 984 | Example |
| 4 | M | GA | 35.9 | −36 | 56.1 | 8.9 | 30.9 | 90 | ◎ | 985 | Example |

Example 2

Cast steel samples were prepared by smelting steel with the chemical compositions listed in Table 5, and they were subjected to hot rolling, acid cleaning, and cold rolling to obtain cold-rolled steel sheets with a thickness of 1.6 mm.

TABLE 5

| Steel sample ID | C | Si | Mn | P | S | N | Al | B | Ti | Cr | Nb | Mo | Cu | Ni | |
|---|---|---|---|---|---|---|---|---|---|---|---|---|---|---|---|
| N | 0.09 | 0.21 | 2.72 | 0.02 | 0.001 | 0.004 | 0.034 | 0.001 | 0.01 | — | 0.014 | — | — | — | Conforming steel |
| O | 0.12 | 0.46 | 2.51 | 0.01 | 0.002 | 0.003 | 0.035 | 0.001 | 0.01 | — | — | — | — | — | Conforming steel |

"—" indicates a content at inevitable impurity level.

Then, each cold-rolled steel sheet was subjected to degreasing with alkali, followed by electrolytic treatment with the steel sheet as the cathode under the conditions described below to produce a pre-annealing Fe-based electroplated steel sheet having a pre-annealing Fe-based electroplating layer on one surface. The coating weight of the pre-annealing Fe-based electroplating layer was calculated with the cross-sectional observation method described above and controlled by current passage time. Subsequently, the pre-annealing Fe-based electroplated steel sheets were subjected to reduction annealing at 15% $H_2$—$N_2$ and a soaking zone temperature of 800° C., with the dew point of the atmosphere adjusted as listed in Table 6, to obtain Fe-based electroplated steel sheets. The obtained Fe-based electroplated steel sheets were cooled to 440° C. to 550° C., and then subjected to hot-dip galvanizing treatment using a hot-dip galvanizing bath at 460° C., where the effective Al concentration in the bath was 0.132 mass % with the balance being Zn and inevitable impurities. Subsequently, the coating amount was adjusted to approximately 50 g/m² per surface by gas wiping to produce galvanized steel sheets. Subsequently, the galvanized steel sheets were subjected to alloying treatment at 490° C. for varying times to produce alloyed galvanized steel sheet samples with different Fe contents diffused in the alloyed galvanized layers.

[Electrolytic Conditions]
Bath temperature: 50° C.
pH: 2.0
Current density: 45 A/dm²
Fe-based electroplating bath: containing 1.5 mol/L of $Fe^{2+}$ ions
Electrode (anode): iridium oxide electrode From each alloyed galvanized steel sheet thus prepared, the coating weight per surface of the Fe-based electroplating layer, the coating weight of the alloyed galvanized layer, the Fe content (mass %) in the alloyed galvanized layer, and the ratio at which the crystal orientations of the Fe-based electroplating layer and the Si-containing cold-rolled steel sheet are integrated at the interface between the Fe-based electroplating layer and the Si-containing cold-rolled steel sheet were determined according to the methods described above.

The resistance to cracking in resistance welding at a welded portion was also investigated for each alloyed galvanized steel sheet thus prepared. The following describes the measurement and evaluation methods of the resistance to cracking in resistance welding at a welded portion.

<Resistance to Cracking in Resistance Welding at Welded Portion>

For each alloyed galvanized steel sheet, the resistance to cracking in resistance welding at a welded portion was evaluated with the method described above when combined with a test galvannealed steel sheet (1.6 mm thick) having a tensile strength of 590 MPa and a coating weight per surface of 50 g/m², with a Si content of less than 0.1%, where the resistance to cracking in resistance welding was not an issue at a hold time of 0.14 seconds. The welding time was 0.36 seconds and the hold times were 0.14 seconds and 0.16 seconds. The nugget diameter was measured by changing the welding current for each Example No., and the evaluation was performed at the welding current where the nugget diameter was 5.9 mm. When no cracks were found in the combined test galvannealed steel sheet, it was taken as example data. This is because if a crack occurs in the combined sheet, the stress on the alloyed galvanized steel sheet to be evaluated is dispersed, making it impossible to perform appropriate evaluation.

The results of the above tests are listed in Table 6. The results demonstrate that the alloyed galvanized steel sheets in our examples, in which Fe-based electroplating layers were formed under the conditions conforming to the present disclosure before the annealing process, exhibited excellent resistance to cracking in resistance welding at a welded portion. In each of our examples where a pre-annealing Fe-based electroplating layer was formed prior to the formation of a galvanized layer, alloying treatment was applied after galvanization to obtain a galvannealed steel sheet, and the coating weight of the Fe-based electroplating layer in the steel sheet was 25.0 g/m² or more, cracks as long as 0.1 mm or more were not observed even at a hold time of 0.14 seconds, and the resistance to cracking in resistance welding at a welded portion was particularly good. In Table 6, the coating weight of the Fe-based electroplating layer and the alloyed galvanized layer is indicated as "-" for the examples where no Fe-based electroplating layer was formed.

TABLE 6

| | | Pre-annealing | | | Alloyed galvanized layer | | Fe-based electroplating layer | | | |
|---|---|---|---|---|---|---|---|---|---|---|
| No. | Steel sample ID | Type of coating or plating | Fe-based electroplating layer Coating weight g/m² | Annealing Dew point ° C. | Coating weight g/m² | Fe % mass % | Coating weight g/m² | Ratio of integrated crystal orientations % | Resistance to cracking in resistance welding | Tensile strength TS MPa | Remarks |
| 1 | N | GA | — | −44 | 62.2 | 10.5 | — | — | X | 835 | Comparative Example |
| 2 | N | GA | 11.2 | −39 | 57.5 | 11.2 | 4.8 | 89 | X | 838 | Comparative Example |
| 3 | N | GA | 27.5 | −40 | 59.4 | 12.0 | 20.4 | 84 | ○ | 835 | Example |
| 4 | N | GA | 39.0 | −36 | 60.1 | 9.8 | 33.1 | 86 | ◎ | 830 | Example |
| 5 | O | GA | — | −38 | 51.2 | 11.9 | — | — | X | 1064 | Comparative Example |
| 6 | O | GA | 12.1 | −43 | 52.0 | 10.6 | 6.6 | 92 | X | 1062 | Comparative Example |
| 7 | O | GA | 25.3 | −37 | 50.6 | 9.1 | 20.7 | 91 | ○ | 1057 | Example |
| 8 | O | GA | 38.8 | −32 | 51.1 | 11.3 | 33.0 | 86 | ◎ | 1058 | Example |

Underlined if outside the appropriate range of the present disclosure.

INDUSTRIAL APPLICABILITY

The alloyed galvanized steel sheet produced with the method disclosed herein not only has excellent resistance to cracking in resistance welding at a welded portion, but also has high strength and excellent formability, making it suitable not only as the raw material used in automotive parts but also as the raw material for applications requiring similar properties in fields such as home appliances and construction materials.

REFERENCE SIGNS LIST

1 Alloyed galvanized steel sheet
2 Si-containing cold-rolled steel sheet
3 Fe-based electroplating layer
4 Alloyed galvanized layer
5 Test galvannealed steel sheet
6 Test specimen
7 Spacer
8 Fixing stand
9 Electrode
10 Nugget
11 Crack

The invention claimed is:

1. An alloyed galvanized steel sheet comprising:
a Si-containing cold-rolled steel sheet containing Si in an amount of 0.1 mass % or more and 3.0 mass % or less;
an Fe-based electroplating layer formed on at least one surface of the Si-containing cold-rolled steel sheet with a coating weight per surface of more than 20.0 g/m²; and
an alloyed galvanized layer formed on the Fe-based electroplating layer, wherein
crystal orientations of the Fe-based electroplating layer and the Si-containing cold-rolled steel sheet are integrated at a ratio of more than 50% at an interface between the Fe-based electroplating layer and the Si-containing cold-rolled steel sheet.

2. The alloyed galvanized steel sheet according to claim 1, wherein the Si-containing cold-rolled steel sheet contains Si in an amount of 0.50 mass % or more and 3.0 mass % or less.

3. The alloyed galvanized steel sheet according to claim 1, wherein the Fe-based electroplating layer is formed with a coating weight per surface of 25.0 g/m² or more.

4. The alloyed galvanized steel sheet according to claim 1, wherein the Si-containing cold-rolled steel sheet has a chemical composition containing, in addition to Si, in mass %,
- C: 0.8% or less,
- Mn: 1.0% or more and 12.0% or less,
- P: 0.1% or less,
- S: 0.03% or less,
- N: 0.010% or less, and
- Al: 1.0% or less, with the balance being Fe and inevitable impurities.

5. The alloyed galvanized steel sheet according to claim 4, wherein the chemical composition further comprises at least one selected from the group consisting of
- B: 0.005% or less,
- Ti: 0.2% or less,
- Cr: 1.0% or less,
- Cu: 1.0% or less,
- Ni: 1.0% or less,
- Mo: 1.0% or less,
- Nb: 0.20% or less,
- V: 0.5% or less,
- Sb: 0.200% or less,
- Ta: 0.1% or less,
- W: 0.5% or less,
- Zr: 0.1% or less,
- Sn: 0.20% or less,
- Ca: 0.005% or less,
- Mg: 0.005% or less, and
- REM: 0.005% or less.

6. The alloyed galvanized steel sheet according to claim 1, wherein the Fe-based electroplating layer has a chemical composition containing at least one element selected from the group consisting of B, C, P, N, O, Ni, Mn, Mo, Zn, W, Pb, Sn, Cr, V, and Co, in a total amount of 10 mass % or less, with the balance being Fe and inevitable impurities.

7. An alloyed galvanized steel sheet comprising:
  a cold-rolled steel sheet;
  an Fe-based electroplating layer formed on at least one surface of the cold-rolled steel sheet with a coating weight per surface of more than 20.0 g/m²; and
  an alloyed galvanized layer formed on the Fe-based electroplating layer, wherein
  crystal orientations of the Fe-based electroplating layer and the cold-rolled steel sheet are integrated at a ratio of more than 50% at an interface between the Fe-based electroplating layer and the cold-rolled steel sheet, and
  the cold-rolled steel sheet is a cold-rolled steel sheet where a test specimen of the cold-rolled steel sheet that is cut to a size of 50 mm×150 mm with a direction orthogonal to a rolling direction as a lengthwise direction is overlapped with a test galvannealed steel sheet that is cut to the same size having a hot-dip galvanized layer with a coating weight per surface of 50 g/m² to obtain a sheet combination,
  next, using a 50-Hz single-phase AC resistance welding machine comprising a servomotor pressure mechanism, the sheet combination is inclined 5° to a lengthwise direction side of the sheet combination with respect to a plane perpendicular to a line connecting central axes of an electrode pair with a tip diameter of 6 mm of the resistance welding machine, a lower electrode of the electrode pair and the sheet combination are fixed so that a gap of 60 mm in a lengthwise direction of the sheet combination and 2.0 mm in a thickness direction of the sheet combination is provided between the lower electrode and the test specimen, an upper electrode of the electrode pair is movable, and resistance welding is applied to the sheet combination under a set of conditions: applied pressure: 3.5 kN, hold time: 0.16 seconds, and welding current and welding time to produce a nugget diameter of 5.9 mm, to obtain a sheet combination with a welded portion, and
  the sheet combination with a welded portion is then cut in half along a lengthwise direction of the test specimen to include a welded portion, a cross section of the welded portion is observed under an optical microscopy at a magnification of 200×, and a crack having a length of 0.1 mm or more is observed.

8. An electrodeposition-coated steel sheet comprising: a chemical conversion layer formed on the alloyed galvanized steel sheet as recited in claim 1; and an electrodeposition coating layer formed on the chemical conversion layer.

9. An automotive part at least partially made from the electrodeposition-coated steel sheet as recited in claim 8.

10. A method of producing an electrodeposition-coated steel sheet, the method comprising:
  subjecting the alloyed galvanized steel sheet as recited in claim 1 to chemical conversion treatment to obtain a chemical-conversion-treated steel sheet with a chemical conversion layer formed on the alloyed galvanized layer; and
  subjecting the chemical-conversion-treated steel sheet to electrodeposition coating treatment to obtain an electrodeposition-coated steel sheet with an electrodeposition coating layer formed on the chemical conversion layer.

11. A method of producing the alloyed galvanized steel sheet of claim 1, the method comprising:
  subjecting a cold-rolled steel sheet containing Si in an amount of 0.1 mass % or more and 3.0 mass % or less to Fe-based electroplating to obtain a pre-annealing Fe-based electroplated steel sheet with a pre-annealing Fe-based electroplating layer formed on at least one surface thereof;
  then subjecting the pre-annealing Fe-based electroplated steel sheet to annealing in an atmosphere with a dew point of −30° C. or lower to obtain an Fe-based electroplated steel sheet;
  then subjecting the Fe-based electroplated steel sheet to galvanization to obtain a galvanized steel sheet; and
  then further subjecting the galvanized steel sheet to alloying treatment to obtain the alloyed galvanized steel sheet comprising an Fe-based electroplating layer having a coating weight per surface of more than 20.0 g/m².

12. The method of producing an alloyed galvanized steel sheet according to claim 11, wherein the cold-rolled steel sheet contains Si in an amount of 0.5 mass % or more and 3.0 mass % or less.

13. The method of producing an alloyed galvanized steel sheet according to claim 11, wherein a coating weight, in unit of g/m², per surface of the pre-annealing Fe-based electroplating layer, denoted by $C.W._{Fe0}$, satisfies the following formula (1):

$$(C.W._{Fe0}) > 20.0 + (C.W._{Zn}) \times [\text{mass}\%\text{Fe}]/100 \tag{1}$$

where $C.W._{Zn}$ denotes a target value of a coating weight, in unit of g/m², per surface of the alloyed galvanized layer, provided:

$$25.0 \text{ g/m}^2 \leq C.W._{Zn} \leq 80.0 \text{ g/m}^2, \text{ and}$$

[mass % Fe] denotes a target value of an Fe content, in mass %, in the alloyed galvanized layer.

14. A method of producing the alloyed galvanized steel sheet of claim 7, the method comprising:

subjecting a cold-rolled steel sheet to Fe-based electroplating to obtain a pre-annealing Fe-based electroplated steel sheet with a pre-annealing Fe-based electroplating layer formed on at least one surface thereof;

then subjecting the pre-annealing Fe-based electroplated steel sheet to annealing in an atmosphere with a dew point of −30° C. or lower to obtain an Fe-based electroplated steel sheet;

then subjecting the Fe-based electroplated steel sheet to galvanization to obtain a galvanized steel sheet; and then further subjecting the galvanized steel sheet to alloying treatment to obtain the alloyed galvanized steel sheet comprising an Fe-based electroplating layer having a coating weight per surface of more than 20.0 g/m$^2$, wherein the cold-rolled steel sheet is a cold-rolled steel sheet where a test specimen of the cold-rolled steel sheet that is cut to a size of 50 mm×150 mm with a direction orthogonal to a rolling direction as a lengthwise direction is overlapped with a test galvannealed steel sheet that is cut to the same size having a hot-dip galvanized layer with a coating weight per surface of 50 g/m$^2$ to obtain a sheet combination, next, using a 50-Hz single-phase AC resistance welding machine comprising a servomotor pressure mechanism, the sheet combination is inclined 5° to a lengthwise direction side of the sheet combination with respect to a plane perpendicular to a line connecting central axes of an electrode pair with a tip diameter of 6 mm of the resistance welding machine, a lower electrode of the electrode pair and the sheet combination are fixed so that a gap of 60 mm in a lengthwise direction of the sheet combination and 2.0 mm in a thickness direction of the sheet combination is provided between the lower electrode and the test specimen, an upper electrode of the electrode pair is movable, and resistance welding is applied to the sheet combination under a set of conditions: applied pressure: 3.5 kN, hold time: 0.16 seconds, and welding current and welding time to produce a nugget diameter of 5.9 mm, to obtain a sheet combination with a welded portion, and the sheet combination with a welded portion is then cut in half along a lengthwise direction of the test specimen to include a welded portion, a cross section of the welded portion is observed under an optical microscopy at a magnification of 200×, and a crack having a length of 0.1 mm or more is observed.

15. The method of producing an alloyed galvanized steel sheet according to claim 14, wherein a coating weight, in unit of g/m$^2$, per surface of the pre-annealing Fe-based electroplating layer, denoted by $C.W._{FeO}$, satisfies the following formula (1):

$$(C.W._{FeO}) > 20.0 + (C.W._{Zn}) \times [mass\%Fe]/100 \quad (1)$$

where $C.W._{Zn}$ denotes a target value of a coating weight, in unit of g/m$^2$, per surface of the alloyed galvanized layer, provided:

$$25.0 \text{ g/m}^2 \leq C.W._{Zn} \leq 80.0 \text{ g/m}^2, \text{ and}$$

[mass % Fe] denotes a target value of an Fe content, in mass %, in the alloyed galvanized layer.

16. The method of producing an alloyed galvanized steel sheet according to claim 11, wherein the Fe-based electroplating is performed in an Fe-based electroplating bath containing at least one element selected from the group consisting of B, C, P, N, O, Ni, Mn, Mo, Zn, W, Pb, Sn, Cr, V, and Co, so that the at least one element is contained in the pre-annealing Fe-based electroplating layer in a total amount of 10 mass % or less.

* * * * *